US008548079B2

(12) United States Patent
Wu et al.

(10) Patent No.: US 8,548,079 B2
(45) Date of Patent: Oct. 1, 2013

(54) TRANSMITTER, TRANSMISSION METHOD, RECEIVER, AND RECEPTION METHOD

(75) Inventors: Jianming Wu, Kawasaki (JP); Takashi Dateki, Kawasaki (JP); Tomohiko Taniguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 172 days.

(21) Appl. No.: 13/027,659

(22) Filed: Feb. 15, 2011

(65) Prior Publication Data

US 2011/0135029 A1  Jun. 9, 2011

Related U.S. Application Data

(63) Continuation of application No. PCT/JP2008/066253, filed on Sep. 9, 2008.

(51) Int. Cl.
*H04L 5/12* (2006.01)
*H04L 23/02* (2006.01)
*H04L 27/36* (2006.01)

(52) U.S. Cl.
USPC ........................ 375/261; 375/286; 375/298

(58) Field of Classification Search
USPC .............. 375/261, 285, 286, 298, 320, 332; 332/103
See application file for complete search history.

(56) References Cited

U.S. PATENT DOCUMENTS

| 4,860,316 A * | 8/1989 | Takenaka et al. ............ 375/298 |
| 6,097,764 A * | 8/2000 | McCallister et al. ......... 375/298 |
| 2006/0140302 A1 * | 6/2006 | Jahan et al. .................. 375/286 |
| 2007/0291874 A1 * | 12/2007 | Park ............................. 375/298 |
| 2008/0247470 A1 * | 10/2008 | Wang et al. .................. 375/261 |

FOREIGN PATENT DOCUMENTS

| JP | 2000-59450 | 2/2000 |
| JP | 2000-68959 | 3/2000 |
| JP | 2005-236750 | 9/2005 |

OTHER PUBLICATIONS

International Search Report dated Oct. 21, 2008, from the corresponding International Application.
3GPP TR 25.814 V7.0.0 3rd Generation Partnership Project; Technical Specification Group Radio Access Network; Physical layer aspects for evolved Universal Terrestrial Radio Access (UTRA) (Release 7) Jun. 2006.
Masakazu Morimoto, et al "A Hierarchical Image Transmission System in a Fading Channel" IEEE Int. Conf. Universal Personal Commun. (ICUPC '95), pp. 769-772, Oct. 1995.
Slawomir Pietrzyk, et al. "Subcarrier and Power Allocation for QoS-aware OFDMA Systems Using Embedded Modulation" in Proc. Int. Conf. Commun. (ICC), vol. 6, pp. 3202-3206, 2004.
Pavan K. Vitthaladevuni, et al. "A Recursive Algorithm for the Exact BER Computation of Generalized Hierarchical QAM Constellations" IEEE Transactions on Information Theory, vol. 49, No. 1, pp. 297-307, Jan. 2003.

(Continued)

*Primary Examiner* — Betsy Deppe
(74) *Attorney, Agent, or Firm* — Katten Muchin Rosenman LLP

(57) ABSTRACT

Multi-level modulation is performed with a signal point constellation in which any three adjacent signal points on a phase plane form an equilateral triangle and at least a distance between a signal point closest to the origin of the phase plane and the origin is increased within a range that the transmission mean power remains unchanged.

12 Claims, 16 Drawing Sheets

(56) References Cited

OTHER PUBLICATIONS

Kannan Ramchandran, et al. "Multiresolution Broadcast for Digital HDTV Using Joint Source/Channel Coding" IEEE Journal on Selected Areas in Communications, vol. 11, No. 1, pp. 6-22, Jan. 1993.

Dong In Kim. "Two-Best User Scheduling for High-Speed Downlink Multicode CDMA with Code Constraint" IEEE Communication Society, Globecom, pp. 2659-2663, Nov. 29, 2004.

MD. Jahangir Hossain, et al. "Rate-Adaptive Hierarchical Modulation-Assisted Two-User Opportunistic Scheduling" IEEE Transactions on Wireless Communications, vol. 6, No. 6, pp. 2076-2085, Jun. 2007.

Victor M. Dasilva, et al. "Fading-Resistant Modulation Using Several Transmitter Antennas" IEEE Transactions on Communications, vol. 45, No. 10, pp. 1236-1244, Oct. 1997.

Joseph Boutros, et al. "Good Lattice Constellations for Both Rayleigh Fading and Gaussain Channels" IEEE Transactions on Information Theory, vol. 42, No. 2, pp. 502-518, Mar. 1996.

Joseph Boutros, et al. "Signal Space Diversity: A Power- and Bandwidth-Efficient Diversity Technique for the Rayleigh Fading Channel" IEEE Transactions on Information Theory, vol. 44, No. 4, pp. 1453-1467, Jul. 1998.

* cited by examiner

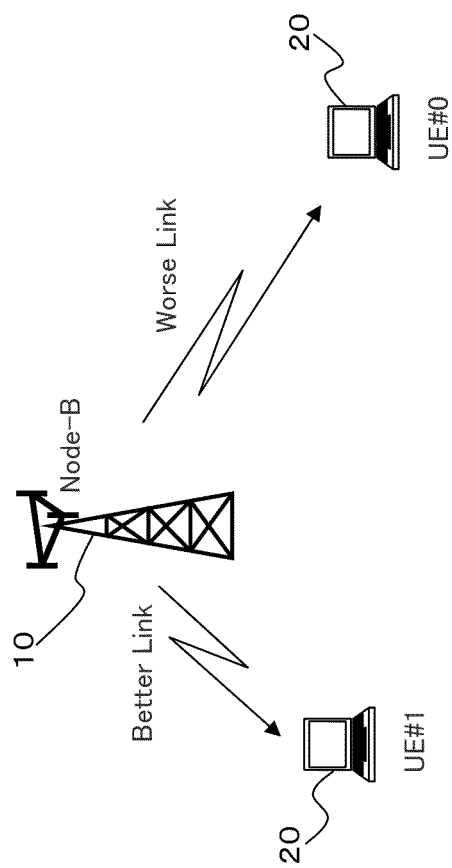

FIG. 16

TRANSMITTER, TRANSMISSION METHOD, RECEIVER, AND RECEPTION METHOD

CROSS-REFERENCE TO RELATED APPLICATION

This application is a continuation Application of a PCT international application No. PCT/JP2008/066253 filed on Sep. 9, 2008 in Japan, the entire contents of which are incorporated by reference.

FIELD

The embodiments discussed herein are related to a transmitter, a transmission method, a receiver, and a reception method.

BACKGROUND

Use of the hierarchical modulation scheme is known as one of answers to perform efficient data mapping to wireless channel resources in the field of wireless communication techniques. The hierarchical modulation scheme is becoming an interesting object in researches in both the scientific field and the industrial field.

The hierarchical modulation scheme is one of techniques which modulates (multiplex-modulates) collectively information in plural channels destined for plural user terminals, and can set grades (hierarchy) of communication quality to the plural channels to be multiplex-modulated.

For example, in the hierarchical modulation scheme, bit positions having different degrees of the quality (degree of susceptibility to error) is raised in a bit string, associated with a signal point (constellation point) arranged on a phase plane, due to the association. The bit positions of information bits to be associated with a signal point are controlled according to importance or priority of the information, thereby to offer different levels of resistance to reception error to different services and users. One of purposes of using such the hierarchical modulation scheme is to increase the whole system capacity according to channel conditions or service modes.

Further, it is tried to introduce the hierarchical modulation scheme into Digital Video Broadcast (DVB) standard, for example. Concept of the hierarchical modulation scheme in DVB is to change the modulation order. For example, a higher modulation order is assigned to a receiver closer to the transmitter, while a low modulation order is assigned to a receiver farther from the transmitter.

In interesting researches relating to portable image transmission systems, use of the hierarchical modulation scheme realizes high-quality and high-speed digital image transmission in a fading channel whose bandwidth is limited. This scheme uses hierarchical Quadrature Amplitude Modulation (QAM) to offer non-uniform transmission reliability according to a layer of a compressed image by Adaptive Discrete Cosine Transform (ADCT) which is general in the image transmission. As a result, this makes it possible to improve the performance of Signal to Noise Ratio (SNR) of rearranged images. There is also proposed a hierarchical modulation scheme with power allocation in Orthogonal Frequency Division Multiplexing Access (OFDMA). Whereby, the number of independent links can be increased and a large capacity can be realized.

Further, it is proposed to realize the system capacity and improve the system fairness with use of multiple best user scheduling in Code Division Multiple Access (CDMA) based on multi-code. The hierarchical modulation scheme is likely to be beneficial to multiple best user opportunistic scheduling which adaptively distinguishes between the normal modulation scheme and the hierarchical modulation scheme.

In order to improve the performance (reception quality) of the fading channel, constellation is discussed along with (phase) rotating operation. According to this rotation mechanism, it is possible to increase Minimum Product Distance (MPD) rather than Minimum Euclidean Distance (MED) on the fading channel to realize so-called modulation diversity.

Non-Patent Document 1: M. Morimoto, M. Okada, and S. Komaki, "A hierarchical image transmission system in a fading channel", in Proc. IEEE Int. Conf. Universal Personal Commun. (ICUPC '95), pp. 769-772, October 1995.

Non-Patent Document 2: S. Pietrzyk, and G. J. M. Janssen, "Subcarrier and power allocation for QoS-aware OFDMA system using embedded modulation", in Proc. Int. Conf. Commun. (ICC), Vo. 6, pp. 3202-3206, 2004.

Non-Patent Document 3: P. K. Vitthaladevuni, and M-S. Alouini, "A recursive algorithm for the exact BER computation of generalized hierarchical QAM constellation", IEEE Trans. On Information Theory, Vol. 49, No. 1, pp. 297-307, January 2003.

Non-Patent Document 4: 3GPP TR 25.814, Physical layer aspects for evolved UTRA, V7.0.0, P 22, June, 2006.

Non-Patent Document 5: K. Ramchandran, A. Orteg, K. M. Uz, and M. Vetterli, "Multiresolution broadcast for digital HDTV using joint source/channel coding", IEEE J. Sel. Are as Commun., Vol 11, No. 1, pp. 6-22, January 1993.

Non-Patent Document 6: D. I. Kim, "Two-best user scheduling for high-speed downlink multicode CDMA with code constraint", in Proc. IEEE Conf. Global Commun. (Globecomm), pp. 2659-2663, Nov. 29-Dec. 3, 2004.

Non-Patent Document 7: M. J. Hossain, M-S. Alouini, and V. K. Bhargava, "Rate adaptive hierarchical modulation-assisted two-user opportunistic scheduling", IEEE Trans. On Wireless Commun. Vol. 6, No. 6, pp. 2076-2085, June 2007.

Non-Patent Document 8: V. M. DaSilva, and E. S. Sousa, "Fading-resistant modulation using several transmitter antennas", IEEE Transaction on Communications, Vol. 45, No. 10, pp. 1236-1244, October 1997.

Non-Patent Document 9: J. Boutros, E. Viterbo, C. Rastello, and J. C. Befiore, "Good lattice constellation for both Rayleigh fading and Gaussian channel", IEEE trans. on information theory, Vol. 42, No. 2, pp. 502-518, March 1996.

Non-Patent Document 10: J. Boutros, E. Viterbo, "Signal space diversity: a power- and bandwidth-efficient diversity technique for the Rayleigh fading channel", IEEE trans. on information theory, Vol. 44, No. 4, pp. 1453-1467, July 1998.

SUMMARY (1) According to an aspect of the embodiments, an apparatus includes a transmitter for transmitting signals obtained by associating a plurality of bit strings with a plurality of signal points represented on a phase plane, respectively, and performing multi-level modulation according to each of the signal points, the transmitter including a multi-level modulator that performs the multi-level modulation with a signal point constellation in which any three adjacent signal points on the phase plane form an equilateral triangle and at least a distance between a signal point closest to origin on the phase plane and the origin is increased within a range that transmission mean power of the signals remains unchanged.

(2) According to an aspect of the embodiments, an apparatus includes a receiver including a demodulator-decoder that demodulates and decodes received data at the bit position unsusceptible to error between the bit position relatively unsusceptible to error and the bit position susceptible to error in the bit string, and a detector that detects the received data obtained by the demodulator-decoder as data destined for its own receiver.

(3) According to an aspect of the embodiments, an apparatus includes a receiver including a first demodulator-decoder that demodulates and decodes first received data at a bit position relatively unsusceptible to error in the bit string from a received signal, a second demodulator-decoder that cancels the first received data obtained by the first demodulator-decoder from the received signal, demodulates and decodes the received signal, and obtains second received data at a bit position relatively susceptible to error in the bit string, and a detector that detects the second received data obtained by the second demodulator-decoder as data destined for its own receiver.

(4) According to an aspect of the embodiments, a method includes a transmission method of transmitting signals obtained by associating a plurality of bit strings with a plurality of signal points represented on a phase plane, respectively, and performing multi-level modulation according to each of the signal points, the transmission method including performing the multi-level modulation with a signal point constellation in which any three adjacent signal points on the phase plane form an equilateral triangle and at least a distance between a signal point closest to origin of the phase plane and the origin is increased within a range that transmission mean power of the signals remains unchanged.

(5) According to an aspect of the embodiments, a method includes a reception method of receiving the signals transmitted in the transmission method over the wireless link having poor performance, the reception method including demodulating and decoding received data at the bit position unsusceptible to error between the bit position relatively unsusceptible to error and the bit position susceptible to error in the bit string, and detecting received data obtained through the demodulation and decoding as data destined for its own.

(6) According to an aspect of the embodiments, a method includes a reception method including demodulating and decoding first received data at a bit position relatively unsusceptible to error in the bit string from a received signal, cancelling the first received data obtained through the demodulation and decoding from the received signal, demodulating and decoding the received signal having undergone the cancelling to obtain second received data at a bit position relatively susceptible to error in the bit string, and detecting the obtained second received data as data destined for its own.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a schematic view illustrating an example of wireless communication system;

FIG. 16 is a diagram illustrating transmission diversity based on a hierarchical modulation scheme according to the embodiment.

DESCRIPTION OF EMBODIMENTS

Figure 2A:
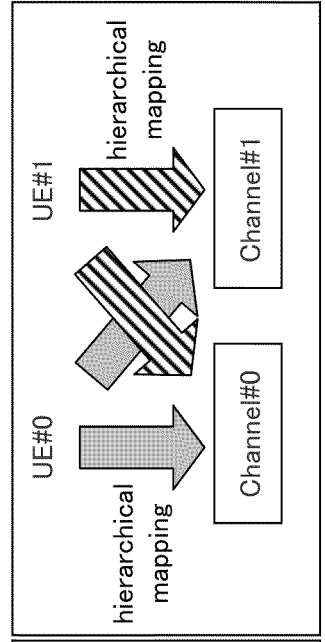
FIG. 2(A) is a diagram schematically illustrating an example of independent mapping process on each of different channels in the multi-level modulation.

Hereinafter, exemplary embodiments will be described with reference to accompanying drawings. The following exemplary embodiments are merely examples and do not intend to exclude various modifications and variations to the proposed method and/or apparatus that are not specifically described herein. Rather, various modifications or variations may be made to the embodiments (for example, by combining the exemplary embodiments) without departing from the scope and spirit of the proposed method and/or apparatus.

[1] Description of an Embodiment (1.1) Overview

In this embodiment, Non-Uniform QAM constellation that can be applied to the hierarchical modulation scheme is proposed. This Non-Uniform QAM constellation is useful as the hierarchical modulation scheme on a fading channel, for example.

In the QAM modulation scheme which is an example of multi-level modulations, a plurality of bit strings (four bits in 16QAM, six bits in 64QAM) are associated with respective signal points (constellation points) represented on a phase plane (constellation space), and multi-level modulation is performed according to each constellation point. On such occasion, bit positions having relatively different degrees of susceptibility to error (quality) occur in the bit string due to the association.

For example, it can be said that a bit position, which is to be quadrature-decided with I axis or Q axis used as the decision axis (reference) on a phase plane in the receiver, in a bit string associated with each constellation point is hardly erroneously decided because a distance of this bit position from the decision axis is longer than another bit position that is to be decided in the quadrature. Therefore, in a bit string associated with each constellation point, bit positions whose degrees (quality) of susceptibility to error are relatively different occur.

Incidentally, the bit position that is unsusceptible to error and the bit position that is susceptible to error aforementioned can be changed by changing a rule applied when the bit string is associated with a constellation point (for example, how to choose the decision axis used on the receiver's side). The bit that is unsusceptible to error is Most Significant Bit (MSB), while the bit that is susceptible to error is-Least Significant Bit (LSB), for example.

The hierarchical modulation scheme uses difference in quality generating in a bit string to be associated with a constellation point. For example, data having a different degree of quality can be mapped to a bit position having a different degree of quality. As an example of data having a different degree of quality, data destined for a receiver having different performance of the wireless link with the transmitter can be taken, as will be described later with reference to FIG. 2(B).

Meanwhile, a wireless link includes a downlink (DL) which is a direction from a wireless base station which is an example of transmitter to a user equipment (UE) which is an example of receiver such as a cellular phone, and an uplink (UL) which is an opposite direction. One or a plurality of channels which are logical communication paths can be set to each of the DL and UL. A channel set to a certain wireless link can be received by a plurality of receivers. As an example of channels, there can be taken physical channels based on multiple access schemes such as CDMA, OFDMA, Time Division Multiple Access (TDMA) and the like.

Non-uniform QAM constellation according to this embodiment is set so as to increase the Minimum Product Distance (MPD) to the MSB of each constellation point represented in a constellation space. The non-uniform QAM constellation according to this embodiment is set so that the Minimum Euclidean Distance (MED) to the LSB of the constellation point remains unchanged (is kept).

According to this embodiment, it is possible to improve the performance of the MSB without sacrificing the performance of the LSB (reception quality). In order to realize such constellation (signal point constellation), this embodiment uses a signal point constellation having an equilateral triangular configuration to be described later to increase the MPD for the MSB without changing the MED for the LSB.

Further, according to such newly designed constellation, the receiver can improve the performance of LSB by using a cancelling method to be described later when employing the hierarchical modulation scheme. For example, when demodulating LSB, the receiver first detects the MSB, and cancels the detected MSB from the received signal to detect the LSB. Since the performance of MSB is superior to the performance of LSB, it is possible to improve the receive performance of a poorly received bit by relying on a superior bit. A plurality of numerical researches to be described later reveal that SNR of both MSB and LSB can be improved by 2.5 to 6 [dB] at a Bit Error Rate (BER) $10^{-3}$.

(1.2) System Model

FIG. 1 depicts an example of wireless communication system according to this embodiment.

A system depicted in FIG. 1 has a wireless base station (Node B) 10 which is one of entities of a Radio Access Network (RAN), and two UEs 20 (UE#0 and UE#1). Note that the number of the wireless base station 10 and the UEs 20 in the system is not limited to this example.

The UEs 20 each communicates with the base station 10 over a wireless link in a wireless area provided by the wireless base station (hereinafter simply referred to as "base station", occasionally) 10. The wireless area is a cell or a sector obtained by dividing the cell. For example, the UEs 20 each communicates with a core network such as an Internet Protocol (IP) network or the like through the RAN.

As the UEs 20, equipments that can transmit both or either one of voice and data to the RAN suffice. For example, the UE 20 can be a mobile station such as a cellular phone, a laptop computer with a wireless interface, a vehicle-mounted wireless equipment, or a fixed wireless equipment.

As given as an example in FIG. 1, when the UE #1 of the two UEs #0 and #1 is closer to the base station 10 than the UE #0, propagation loss between the UE #0 which is farther than the UE #1 and the base station 10 is apt to increase as compared with the propagation loss between the UE #1 and the base station 10. For this reason, wireless link performance between the base station 10 and the UE #0 is apt to be degraded as compared with the wireless link performance between the base station 10 and the UE #1.

In order to improve the wireless link performance between the base station 10 and the UE #0, can be used are transmission diversity, repetitive transmission, low-level modulation scheme, coding scheme (MCS: Modulation and Coding Scheme), etc. Incidentally, the base station 10 can estimate the wireless link performance between the UE 20 and the base station 10 on the basis of the receive quality of the UL, or can find out the wireless link performance of the DL by receiving reported information about the receive quality estimated by the UE 20. The reported information about the receive quality corresponds to information about the receive SNR, Channel Quality Indicator (CQI), etc.

Now, let us consider a case where the base station 10 uses channels #0 and #1 which are independent from one another to transmit data destined for the UE #0 and data destined for the UE #1, separately.

As given as an example in FIG. 2(A), mapping process to the channels #0 and #1 can be performed independently on each of the channels #0 and #1. As an example, the data destined for the UE #0 is mapped to the channel #0 in the DL, while the data destined for the UE #1 is mapped to the different channel #1 in the DL. Such the independent mapping process can cause inefficient data transmission when the wireless links between the two UEs #0 and #1 are in environments that the performances thereof are non-uniform.

On the other hand, according to the hierarchical modulation scheme between the UEs #0 and #1, part of bits of one or a plurality of symbols of data destined for the UE #0 are mapped to the channel #0, while part or all of the remaining bits are mapped to the channel #1. Similarly, data destined for the UE #1 are distributively mapped to the channels #0 and #1 (hereinafter referred to as cross mapping, occasionally).

Such hierarchical modulation scheme enables a specific UE 20, that is, a UE 20 having high priority, for example, to secure a predetermined receive performance, and facilitates application of transmission diversity to be described later to improve the (receive) performance of the UE 20 having high priority. From numerical results obtained through several simulations to be exemplified later, it is found that the system performance can be improved by the use of the hierarchical modulation scheme (cross mapping).

(1.3) Constellation Design for Code Modulation

In this embodiment, exemplified is non-uniform constellation in both 16QAM and 64QAM used for mapping of signals in I phase or Q phase. For comparison, FIG. 3 depicts a uniform rectangular constellation (hereinafter referred to as normal constellation) in 16QAM when MED is $\alpha$.

Figure 3:
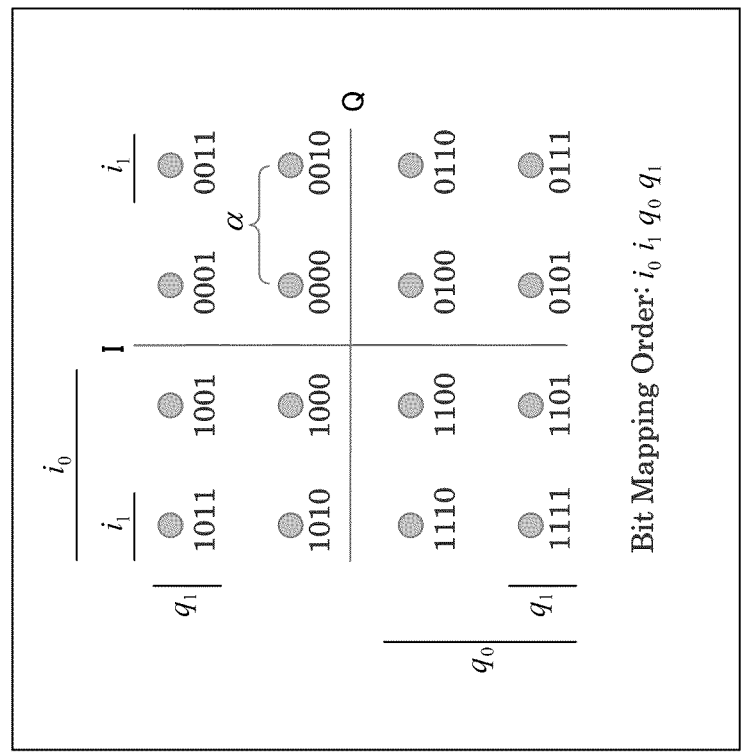
FIG. 3 is a diagram illustrating an example of normal 16QAM constellation.

It can be said that, in the constellation depicted in FIG. 3, MSB (the first and second bits) of each bit string of four bits associated with each constellation point are bits that are less susceptible to error (high priority bits) than the remaining LSB (the third and fourth bits) since the MSB is quadrature-decided with I axis or Q axis as the decision axis on the receiver's side. Incidentally, the fashion of associating a constellation point with a bit string is not limited to this example. By inventing the associating, it becomes possible to set three or more hierarchies to the degree of susceptibility to error.

Figure 4:
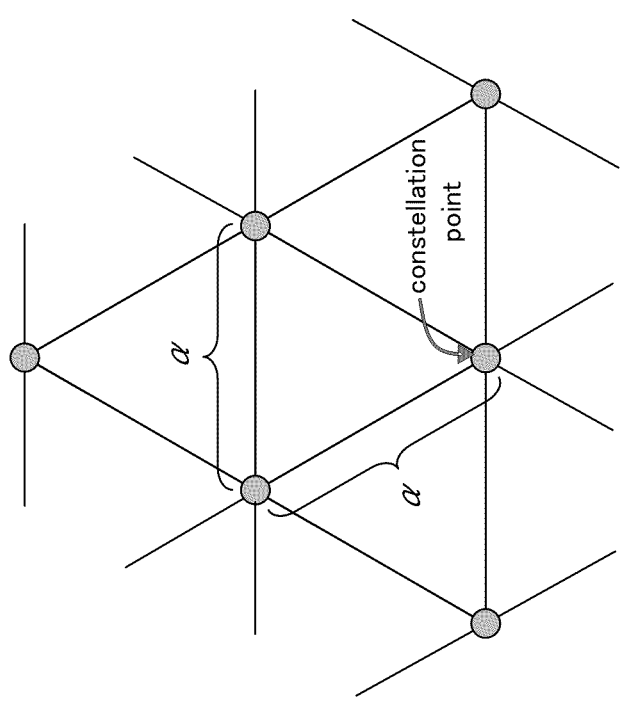
FIG. 4 is a diagram partly illustrating an example of a newly designed constellation according to an embodiment.

On the other hand, the newly designed constellation according to this embodiment is a non-uniform constellation in which arbitrary three adjacent constellation points with respect to the LSB elements form an equilateral triangle, as depicted in FIG. 4. Incidentally, "Non-Uniform" is a term used in comparison with "Uniform" that the constellation depicted in FIG. 3 is so expressed.

Since probability of occurrence of error is dominated by MED between constellation points, the newly designed constellation according to this embodiment is so designed as to achieve receive quality, that is, Symbol Error Rate (SER), for example, equivalent to that of the constellation depicted in FIG. 3.

In the newly designed constellation for 16QAM and 64QAM, a larger MPD can be given to the MSB, while the same MED can be kept for the LSB. Incidentally, low priority bit in 16QAM is called LSB, while low priority bits in 64QAM are called Significant Bit (SB) and LSB. In this embodiment, the terms are unified for the sake of convenience, and the low priority bits in the both modulations are called LSB.

This embodiment takes the newly designed constellation for 16QAM and 64QAM as examples, but the similar constellation design can be made for QAM of a larger value such as 256QAM.

(1.4) Constellation Design Reference on Fading Channel

An example of references that determine a suitable or most suitable constellation on a Rayleigh fading channel is described in the foregoing Non-Patent Document 9 or Non-Patent Document 10.

Minimum value (MPD) $d_{min}^{(L)}$ of product distance in L dimensions can be given by the following expression (1) from a relationship between any two constellation points $x_{i,j,l}$ and $y_{i,j,l}$, where $x_{i,j,l} \neq y_{i,j,l}$.

[Expression 1]

$$d_{min}^{(L)} = \min_{i,j} \prod_{l=0}^{L-1} |(x_{i,j,l} - y_{i,j,l})| \tag{1}$$

Incidentally, L represents a dimension anti-fading factor. For example, channels having independent Ls has an L-dimensional anti-fading constellation. Therefore, a constellation can be designed in a space of $I_0, I_1, \ldots, I_{L-1}$, not in the IQ space. Similarly, a constellation can be designed in a space of $Q_0, Q_1, \ldots, Q_{L-1}$.

In the constellation design according to this embodiment, a case of L=2 is supposed for the sake of convenience. Therefore, the constellation space can be given by a pair of $I_0$ and $I_1$, or a pair of $Q_0$ and $Q_1$, or a pair of I and Q. Namely, in the newly designed constellation according to this embodiment, $I_0$ and $I_1$ ($Q_0$ and $Q_1$) are applicable to independent channel elements, while I and Q are applicable to existing dependent channel elements.

(1.5) Constellation of 16QAM

Here, illustrated is a case where a constellation of 16QAM is designed, and both of I phase signals belonging to two independent channel elements are mapped in a constellation space of $I_0$ and $I_1$. This can be applied to Q phase signals, as well.

The constellation according to this embodiment can improve the constellation resistance to fading of MSB. Further, the constellation of this embodiment can keep Euclidean distance a between constellation points of LSB, like the normal constellation.

Figure 5:
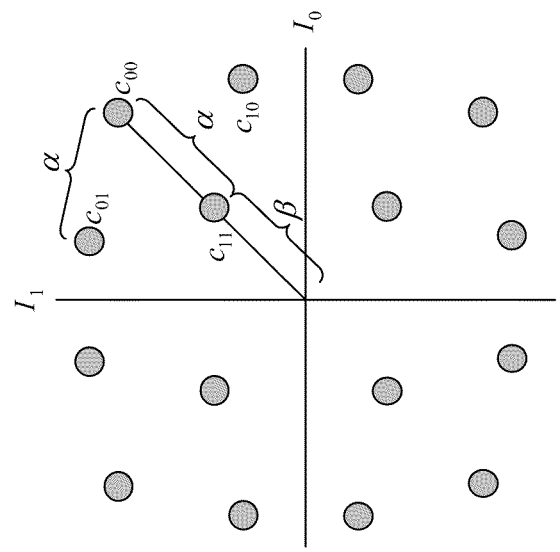
FIG. 5 is a diagram illustrating an example of newly designed 16QAM constellation.

FIG. 5 depicts a newly designed constellation in the case of 16QAM. A distance between adjacent I-phase constellation points is the same distance (Euclidean distance) $\alpha$. Namely, arbitrary three adjacent constellation points form an equilateral triangle in the constellation space ($I_0 I_1$ space). A distance between a constellation point $C_{11}$ closest to the origin and the origin is $\beta$.

According to geometrical induction based on expected constellation behavior, coordinates of constellation points $C_{00}, C_{01}, C_{10}, C_{11}$ belonging to the first quadrant (region of I>0 and Q>0) in $I_0 I_1$ space can be expressed with $\alpha$ and $\beta$, as follows.

[Expression 2]

$$c_{11} = \left(\frac{\sqrt{2}}{2}\beta, \frac{\sqrt{2}}{2}\beta\right)$$

$$c_{00} = \left(\frac{\sqrt{2}}{2}(\alpha+\beta), \frac{\sqrt{2}}{2}(\alpha+\beta)\right)$$

$$c_{10} = \left(\frac{\sqrt{2}+\sqrt{6}}{4}\alpha + \frac{\sqrt{2}}{2}\beta, \frac{\sqrt{2}-\sqrt{6}}{4}\alpha + \frac{\sqrt{2}}{2}\beta\right)$$

$$c_{01} = \left(\frac{\sqrt{2}-\sqrt{6}}{4}\alpha + \frac{\sqrt{2}}{2}\beta, \frac{\sqrt{2}+\sqrt{6}}{4}\alpha + \frac{\sqrt{2}}{2}\beta\right)$$

Other constellation points are symmetrical to $C_{00}, C_{01}, C_{10}, C_{11}$ with respect to $I_0$ axis, $I_1$ axis, or the origin. Therefore, the coordinates of the other constellation points can be readily derived by suitably changing positive and negative signs of the above $C_{00}, C_{01}, C_{10}, C_{11}$.

Powers of all the constellation points are added, with a constant transmission mean power $P_w$, whereby a relationship among $\alpha$, $\beta$ and $P_w$ can be given by the following expression (2).

$$\beta = \frac{-\alpha + \sqrt{4P_w - 2\alpha^2}}{2} \quad (2)$$

Figure 6:
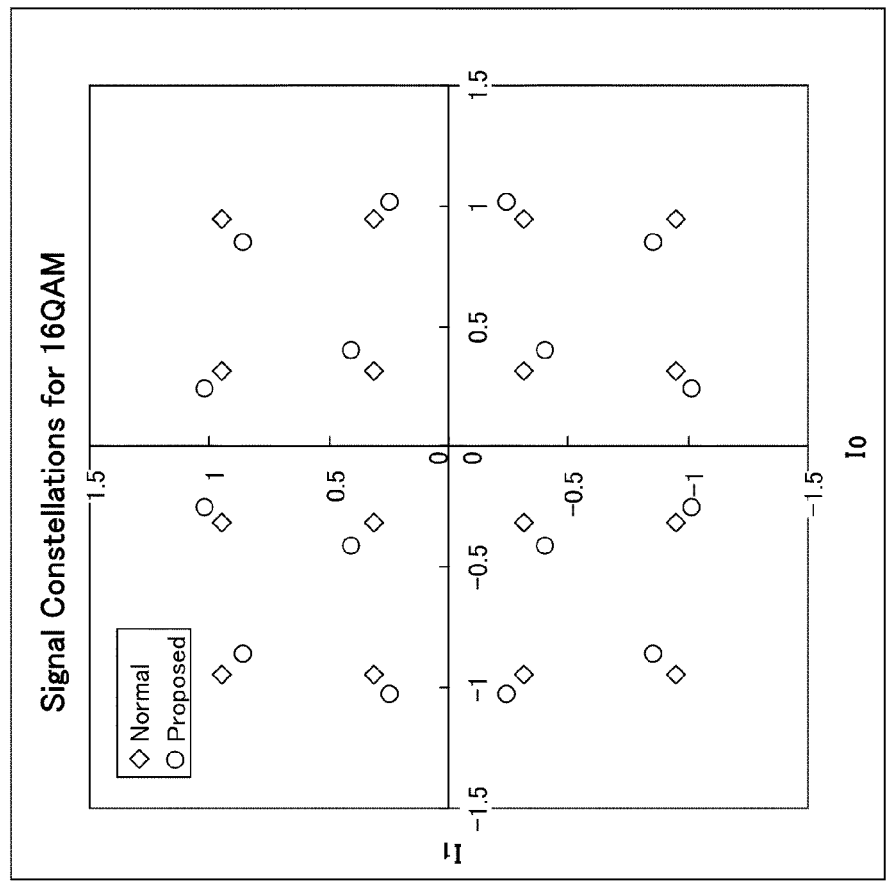
FIG. 6 is a diagram illustrating an example of numerical values obtained through simulation of a newly designed 16QAM constellation in comparison with a normal 16QAM constellation.

For example, it is assumed that the same MED($\alpha$) between constellation points as that in the normal constellation is kept, with transmission mean power $P_w=1$ and $\alpha=2/(10^{1/2})$. In this case, constellations in both normal design and new design are as depicted in FIG. 6, for example. In FIG. 6, "◇" sign represents a constellation point in normal constellation, while "○" sign represents a constellation point in the newly designed constellation according to this embodiment.

An example of coordinate values of the constellation points $c_{00}$, $c_{01}$, $c_{10}$ and $c_{11}$ are illustrated in the following table 1.

TABLE 1

Example of coordinate values in normal and newly designed constellations (16QAM)

|  | Normal Constellation | | New Constellation | |
| --- | --- | --- | --- | --- |
|  | $I_0$ | $I_1$ | $I_0$ | $I_1$ |
| $c_{11}$ | 0.316228 | 0.316228 | 0.408849 | 0.408849 |
| $c_{00}$ | 0.948683 | 0.948683 | 0.856062 | 0.856062 |
| $c_{10}$ | 0.948683 | 0.316228 | 1.019754 | 0.245157 |
| $c_{01}$ | 0.316228 | 0.948683 | 0.245157 | 1.019754 |

From Table 1, it is found that a distance between the constellation point $c_{11}$ closest to the origin and the origin in the newly designed constellation can be increased by about 29 percent as compared with the normal constellation. Therefore, the newly designed constellation can improve the resistance to fading as compared with the normal constellation.

From Table 1, it is also found that, in the newly designed constellation, the peak power at the constellation point $c_{00}$ farthest from the origin can be decreased by about 23 percent as compared with the normal constellation. Therefore, the total of transmission mean powers can be the same as that of the normal constellation even when the distance between the constellation point $c_{11}$ and the origin is increased.

(1.6) Constellation of 64QAM

Like the constellation of 16QAM above-mentioned, it is possible to design a constellation of 64QAM. For example, I-phase signals belonging to two independent channels are mapped in $I_0I_1$ space. Similarly, Q-phase signals are mapped in $Q_0Q_1$ space.

Figure 7:
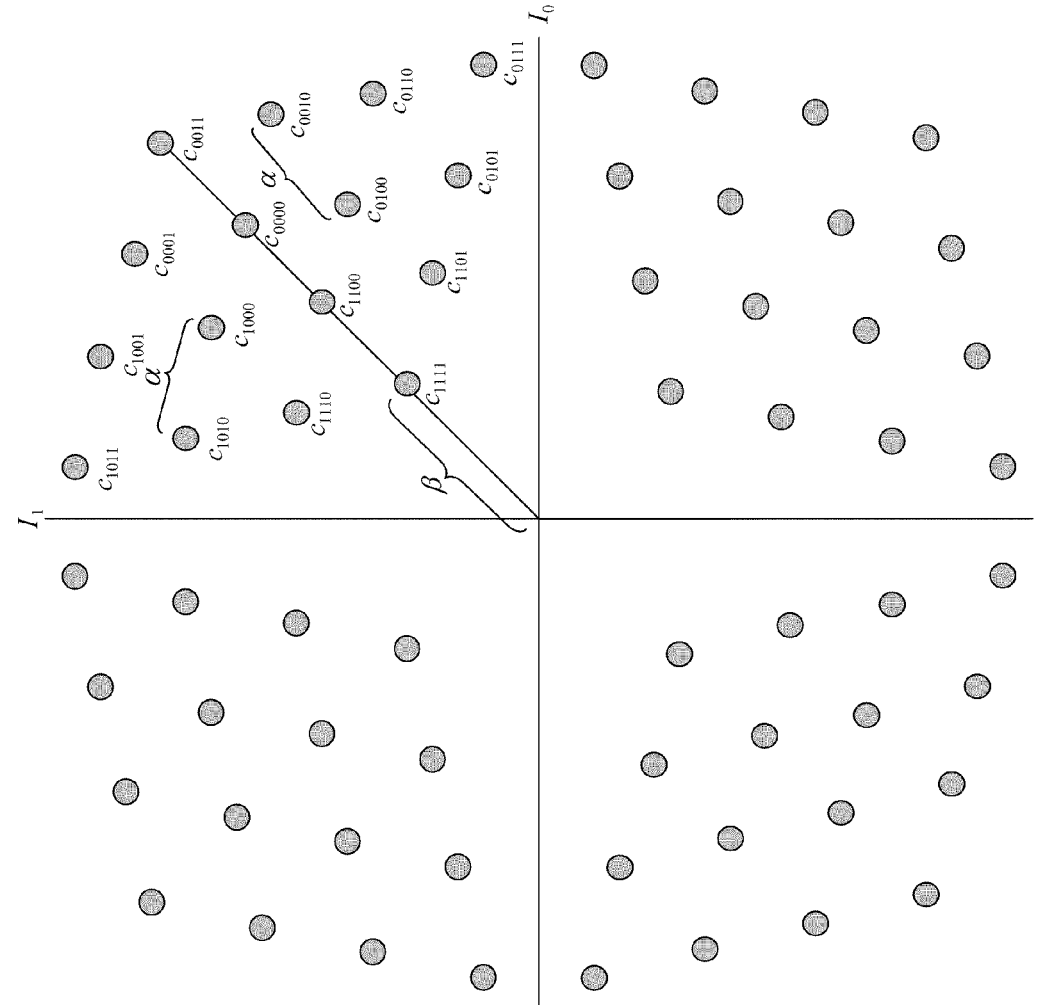
FIG. 7 is a diagram illustrating an example of newly designed 64QAM constellation.

FIG. 7 depicts an example of mapping in the $I_0I_1$ space. In FIG. 7, a distance between constellation points in I phase is the same as MED($\alpha$) in the normal constellation. According to the geometrical induction based on expected constellation behavior, coordinates of constellation points $c_{0000}$, $c_{0001}$, ... $c_{1111}$, belonging to the first quadrant of $I_0I_1$ space can be given with $\alpha$ and $\beta$, as follow.

$$c_{1111} = \left(\frac{\sqrt{2}}{2}\beta, \frac{\sqrt{2}}{2}\beta\right) \quad \text{[Expression 4]}$$

$$c_{1100} = \left(\frac{\sqrt{2}}{2}(\alpha+\beta), \frac{\sqrt{2}}{2}(\alpha+\beta)\right)$$

$$c_{0000} = \left(\frac{\sqrt{2}}{2}(2\alpha+\beta), \frac{\sqrt{2}}{2}(2\alpha+\beta)\right)$$

$$c_{0011} = \left(\frac{\sqrt{2}}{2}(3\alpha+\beta), \frac{\sqrt{2}}{2}(3\alpha+\beta)\right)$$

$$c_{1101} = \left(\frac{\sqrt{2}+\sqrt{6}}{4}\alpha + \frac{\sqrt{2}}{2}\beta, \frac{\sqrt{2}-\sqrt{6}}{4}\alpha + \frac{\sqrt{2}}{2}\beta\right) \quad \text{[Expression 5]}$$

$$c_{0100} = \left(\frac{3\sqrt{2}+\sqrt{6}}{4}\alpha + \frac{\sqrt{2}}{2}\beta, \frac{3\sqrt{2}-\sqrt{6}}{4}\alpha + \frac{\sqrt{2}}{2}\beta\right)$$

$$c_{0010} = \left(\frac{5\sqrt{2}+\sqrt{6}}{4}\alpha + \frac{\sqrt{2}}{2}\beta, \frac{5\sqrt{2}-\sqrt{6}}{4}\alpha + \frac{\sqrt{2}}{2}\beta\right)$$

$$c_{0101} = \left(\frac{\sqrt{2}+\sqrt{6}}{2}\alpha + \frac{\sqrt{2}}{2}\beta, \frac{\sqrt{2}-\sqrt{6}}{2}\alpha + \frac{\sqrt{2}}{2}\beta\right)$$

$$c_{0110} = \left(\frac{2\sqrt{2}+\sqrt{6}}{2}\alpha + \frac{\sqrt{2}}{2}\beta, \frac{2\sqrt{2}-\sqrt{6}}{2}\alpha + \frac{\sqrt{2}}{2}\beta\right) \quad \text{[Expression 6]}$$

$$c_{0111} = \left(\frac{3\sqrt{2}+3\sqrt{6}}{4}\alpha + \frac{\sqrt{2}}{2}\beta, \frac{3\sqrt{2}-3\sqrt{6}}{4}\alpha + \frac{\sqrt{2}}{2}\beta\right)$$

$$c_{1110} = \left(\frac{\sqrt{2}-\sqrt{6}}{4}\alpha + \frac{\sqrt{2}}{2}\beta, \frac{\sqrt{2}+\sqrt{6}}{4}\alpha + \frac{\sqrt{2}}{2}\beta\right)$$

$$c_{1000} = \left(\frac{3\sqrt{2}-\sqrt{6}}{4}\alpha + \frac{\sqrt{2}}{2}\beta, \frac{3\sqrt{2}+\sqrt{6}}{4}\alpha + \frac{\sqrt{2}}{2}\beta\right)$$

$$c_{0001} = \left(\frac{5\sqrt{2}-\sqrt{6}}{4}\alpha + \frac{\sqrt{2}}{2}\beta, \frac{5\sqrt{2}+\sqrt{6}}{4}\alpha + \frac{\sqrt{2}}{2}\beta\right) \quad \text{[Expression 7]}$$

$$c_{1010} = \left(\frac{\sqrt{2}-\sqrt{6}}{2}\alpha + \frac{\sqrt{2}}{2}\beta, \frac{\sqrt{2}+\sqrt{6}}{2}\alpha + \frac{\sqrt{2}}{2}\beta\right)$$

$$c_{1001} = \left(\frac{2\sqrt{2}-\sqrt{6}}{2}\alpha + \frac{\sqrt{2}}{2}\beta, \frac{2\sqrt{2}+\sqrt{6}}{2}\alpha + \frac{\sqrt{2}}{2}\beta\right)$$

$$c_{1011} = \left(\frac{3\sqrt{2}-3\sqrt{6}}{4}\alpha + \frac{\sqrt{2}}{2}\beta, \frac{3\sqrt{2}+3\sqrt{6}}{4}\alpha + \frac{\sqrt{2}}{2}\beta\right)$$

Other constellation points are symmetrical to the above-mentioned $c_{0000}$, $c_{0001}$, ... and $c_{1111}$ with respect to $I_0$ axis, or $I_1$ axis, or the origin, like the case of 16QAM. Therefore, coordinates of the other constellation points can be readily derived by suitably changing the negative and positive signs of the above-mentioned $c_{0000}$, $c_{0001}$, ... and $c_{1111}$.

Powers of all constellation points are added, with a constant transmission mean power $P_w$, whereby a relationship among $\alpha$, $\beta$, and $P_w$ can be given by the following expression (3).

$$\beta = \frac{-3\alpha + \sqrt{4P_w - 10\alpha^2}}{2} \quad (3)$$

Figure 8:
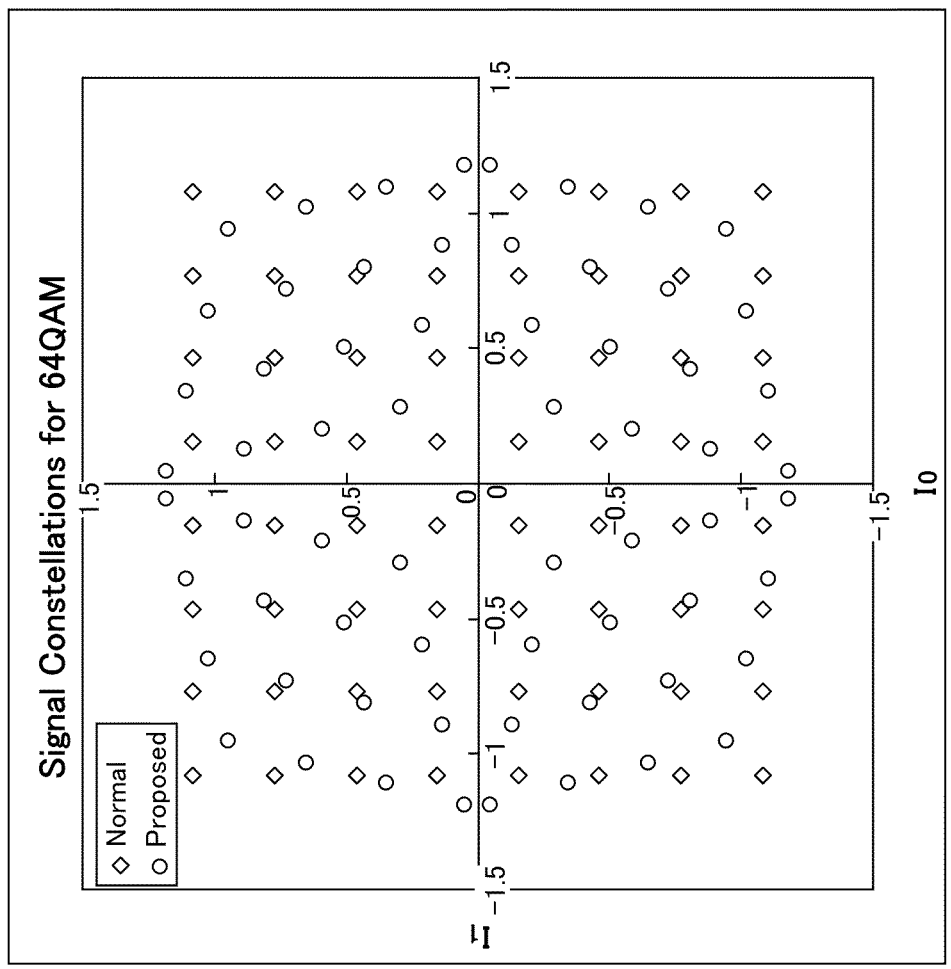
FIG. 8 is a diagram illustrating an example of numerical values obtained through simulation of a newly designed 64QAM constellation in comparison with a normal 64QAM constellation.

When the same MED($\alpha$) is kept with the transmission mean power being $P_w=1$ and $\alpha=2/(42^{1/2})$, both of the normal and newly designed constellations are as depicted in FIG. 8.

In FIG. 8, "◇" sign represents a constellation point in the normal constellation, while "○" sign represents a constellation point in the newly designed constellation according to this embodiment.

Table 2 below illustrates an example of coordinate values of constellation points $c_{0000}$, $c_{0001}$, ... and $c_{1111}$.

TABLE 2

Example of coordinate values in normal and newly designed constellations (64QAM).

|  | Normal Constellation | | New Constellation | |
| --- | --- | --- | --- | --- |
|  | $I_0$ | $I_1$ | $I_0$ | $I_1$ |
| $c_{1111}$ | 0.154303 | 0.154303 | 0.289887 | 0.289887 |
| $c_{1100}$ | 0.46291 | 0.46291 | 0.508104 | 0.508104 |
| $c_{0000}$ | 0.771517 | 0.771517 | 0.726322 | 0.726322 |
| $c_{0011}$ | 1.080123 | 1.080123 | 0.94454 | 0.94454 |
| $c_{1101}$ | 0.46291 | 0.154303 | 0.587978 | 0.210013 |
| $c_{0100}$ | 0.771517 | 0.46291 | 0.806196 | 0.428231 |
| $c_{0010}$ | 1.080123 | 0.771517 | 1.024414 | 0.646449 |
| $c_{0101}$ | 0.771517 | 0.154303 | 0.886069 | 0.13014 |
| $c_{0110}$ | 1.080123 | 0.46291 | 1.104287 | 0.348358 |
| $c_{0111}$ | 1.080123 | 0.154303 | 1.18416 | 0.050267 |
| $c_{1110}$ | 0.154303 | 0.46291 | 0.210013 | 0.587978 |
| $c_{1000}$ | 0.46291 | 0.771517 | 0.428231 | 0.806196 |
| $c_{0001}$ | 0.771517 | 1.080123 | 0.646449 | 1.024414 |
| $c_{1010}$ | 0.154303 | 0.771517 | 0.13014 | 0.886069 |
| $c_{1001}$ | 0.46291 | 1.080123 | 0.348358 | 1.104287 |
| $c_{1011}$ | 0.154303 | 1.080123 | 0.050267 | 1.18416 |

From Table 2, it is found that a distance between a constellation point $c_{1111}$ closest to the origin and the origin in the newly designed constellation can be increased by about 88 percent as compared with the normal constellation. Therefore, the resistance to fading can be improved as compared with the normal constellation. Namely, it is possible to further improve the receive performance of the receiver in data transmission using multi-level modulation.

From table 2, it is also found that the peak power at a constellation point $c_{0011}$ farthest from the origin in the newly designed constellation can be decreased by 31 percent as compared with the normal constellation. Even when the distance between the constellation point $c_{1111}$ and the origin is increased, the total transmission mean power can remain the same as that in the normal constellation point.

In other words, the base station 10 as being an example of the transmitter has a multi-level modulator which performs multi-level modulation with a signal point constellation in which any three adjacent signal points on a phase plane form an equilateral triangle and at least a distance between a signal point closest to the origin on the phase plane and the origin is increased within a range that the transmission mean power of the transmission signals remain unchanged. An example of configuration of the multi-level modulator will be described later with reference to FIG. 13.

(1.7) Bit Mapping Rule in Hierarchical Modulation Scheme

Rule of bit mapping using the above-mentioned newly designed constellation can be based on quality of a bit such as MSB, LSB or the like.

As aforementioned, according to QAM modulation scheme, a plurality of bit strings (four bits in 16QAM, six bits in 64QAM) are associated with respective constellation points on the phase plane, and multi-level modulation is performed according to each constellation point. Due to the association, bits having different degrees of quality are generated in the bit string (bit susceptible to error and bit unsusceptible to error).

As an example of hierarchical modulation, data is mapped to a bit position having a different degree of susceptibility to error in a bit string associated with a constellation point according to a difference in wireless link performance. For example, an information bit transmitted through a wireless link having low performance is preferentially mapped to a bit (for example, MSB) having relatively good quality, while an information bit transmitted through a wireless link having high performance is preferentially mapped to a bit (for example, LSB) having relatively poor quality.

An example of this is illustrated below.

As depicted in FIG. 3, according to the hierarchical modulation scheme based on normal 16QAM constellations, modulated signal components (four bits) $i_0^{(0)}$, $i_1^{(0)}$, $q_0^{(0)}$, $q_1^{(0)}$, destined for the UE #0 are obtained, while modulated signal components (four bits) $i_0^{(1)}$, $i_1^{(1)}$, $q_0^{(1)}$, $q_1^{(1)}$ destined for the UE #1 are obtained, where $i_0^{(0)}$ and $i_1^{(0)}$ represent I phase signal components destined for the UE #0, while $q_0^{(0)}$ and $q_1^{(0)}$ represent I phase signal components destined for the UE #0.

Figure 9:
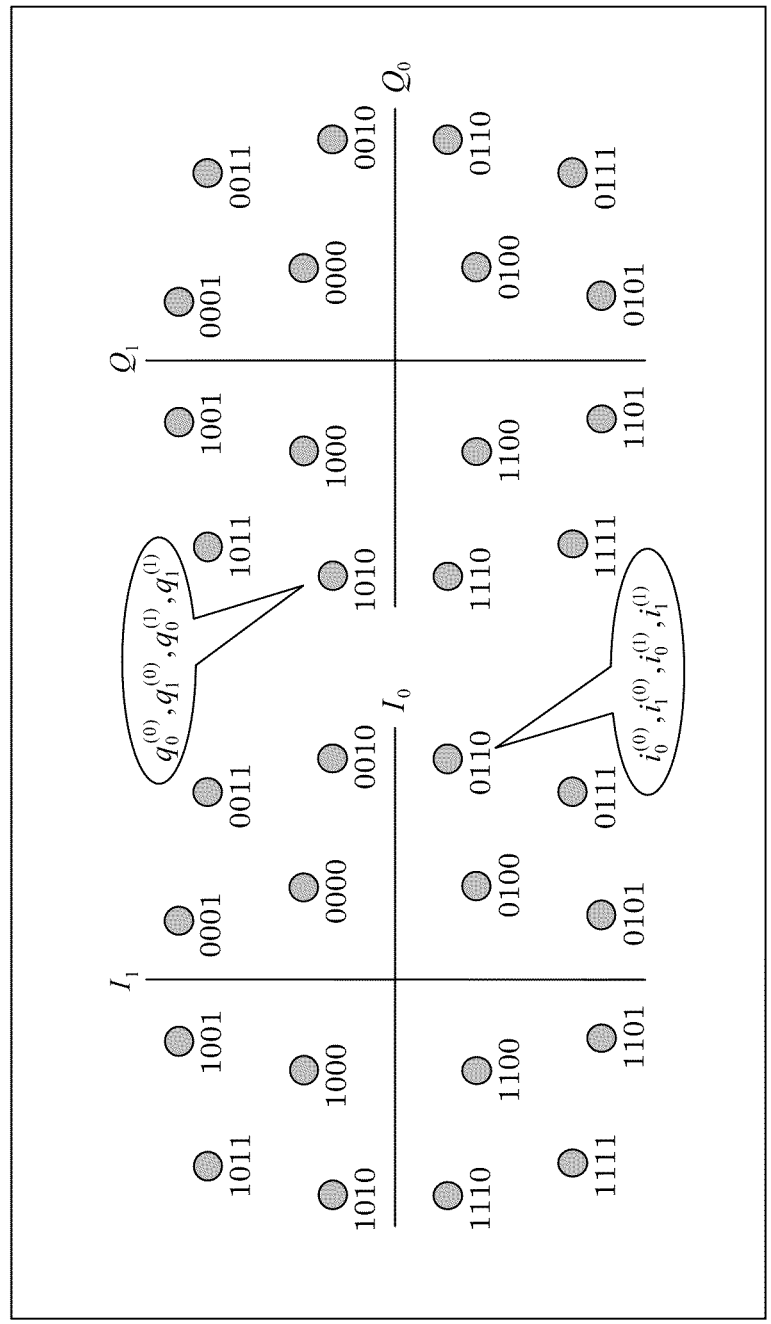
FIG. 9 is a diagram illustrating an example of hierarchical modulation using a newly designed 16QAM constellation.

With use of signals in designed constellations as depicted in FIG. 9, I phase signal components $i_0^{(0)}$ and $i_1^{(0)}$ of a signal destined for the UE #0 having poor wireless link performance depicted in FIG. 1 are mapped to bits (for example, MSB) having relatively good quality in a channel #0, while Q phase signal components $q_0^{(0)}$, $q_1^{(0)}$ of the same are mapped to bits (for example, MSB) having relatively good quality in a different channel #1.

On the other hand, with respect to a signal destined for the UE #1 having good wireless link performance, I phase signal components $i_0^{(1)}$ and $i_1^{(1)}$ are mapped to bit positions (for example, LSB) having relatively poor quality in the channel #0, while Q phase signal components $q_0^{(1)}$ and $q_1^{(1)}$ are mapped to bits (for example, LSB) having relatively poor quality in the different channel #1.

Namely, in this example, data destined for the UE #1 having good wireless link performance is mapped to bit positions susceptible to error in a bit string associated with a constellation point. On the other hand, data destined for the UE #0 having poor wireless link performance is mapped to bit positions unsusceptible to error in the bit string of the constellation point.

Figure 13:
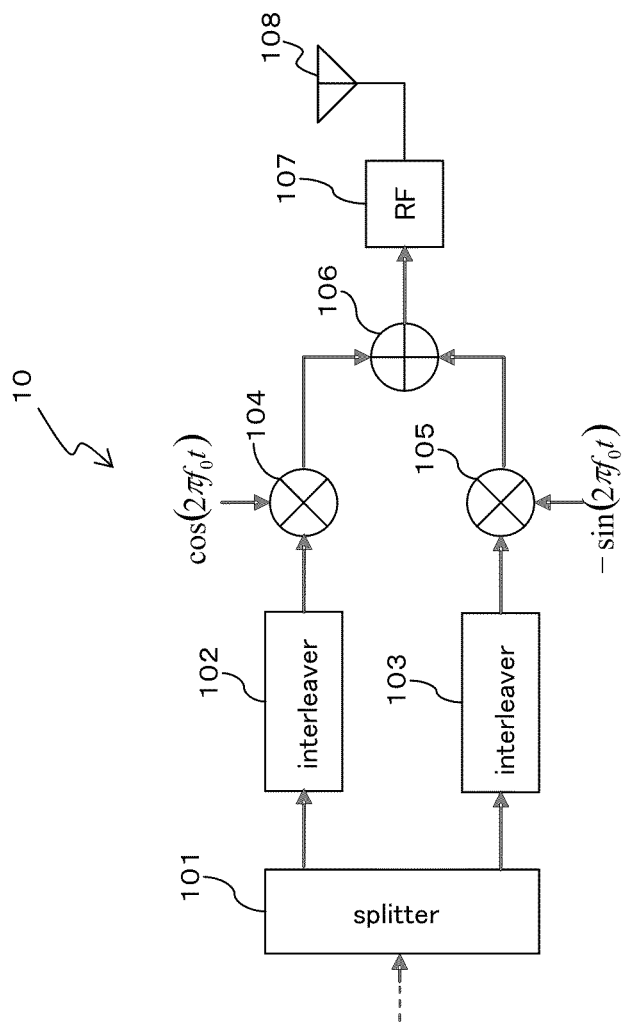
FIG. 13 is a block diagram illustrating an example of configuration of a transmitter (multi-level modulator) according to the embodiment.

Such bit mapping (multi-level modulation) can be performed with the use of a splitter 101, interleavers 102 and 103, multipliers 104 and 105 and an adder (multiplexer) 106, as depicted in FIG. 13, for example. For example, transmission data is split into two by the splitter 101. One of the split data is interleaved by one interleaver 102 so that I phase signal components (or Q phase signal components) thereof are collected. The other of the split data is interleaved by the other interleaver 103 so that Q phase signal components (or I phase signal components) are collected.

The multipliers 104 and 105 multiply outputs from the interleavers 102 and 103 by carrier signals (frequency $f_0$) whose phases are orthogonal (differ by $\pi/2$), respectively, to realize orthogonal modulation in the $I_0I_1$ space or $Q_0Q_1$ space. Outputs from the multipliers 104 and 105 are multiplexed by the adder (multiplexer) 106, and inputted to an RF unit 107.

The RF unit 107 performs a predetermined wireless transmission process on the multiplexed signal from the multiplexer 106, and transmits the wireless signal in the DL from a transmission antenna 108. The wireless transmission process can include Digital to Analog (DA) conversion, frequency conversion (up conversion) to the wireless frequency, power amplification to a predetermined transmission power, etc., for example.

In the case of 64QAM, a bit mapping rule similar to the above is applicable to modulated signal components (six bits) $i_0^{(0)}, i_1^{(0)}, i_2^{(0)}, q_0^{(0)}, q_1^{(0)}, q_2^{(0)}$ obtained to be destined for the UE #0, and to modulated signal components (six bits) $i_0^{(1)}, i_1^{(1)}, i_2^{(1)}, q_0^{(1)}, q_1^{(1)}, q_2^{(1)}$ obtained to be destined for the UE #1.

When the channels #0 and #1 are independent from each other, diversity transmission to be described later is also feasible.

(1.8) Receiving Process in Hierarchical Modulation Scheme

As aforementioned, according to the hierarchical modulation scheme, bits having different degrees of quality generating in a bit string to be associated with a constellation point can be used in data transmission destined for different UEs 20.

Namely, MSB which is an example of a bit having good quality can be used in data transmission destined for a first UE 20, while LSB which is an example of a bit having relatively poor quality can be used in data transmission destined for a second UE 20. However, even if the performance of MSB is improved, this is not helpful to improve the performance of LSB because the receiving process is performed in each of the UEs 20.

According to this embodiment, a hierarchical cancelling method, which can improve the performance of LSB, is used as an example of the receiving process. Use of this cancelling method facilitates to narrow down readily and certainly a range (choices) in which the LSB can be a correct received signal.

A procedure of the process relating to LSB mapping bit detection in the UE #1 is as follows.

(1) The UE #1 acting as a receiver detects MSB as a received bit destined for the UE #0, irrespective of whether the received bit is destined for itself (UE #1) or not.

(2) Next, the UE #1 cancels the detected MSB from the received signal to detect LSB.

Such hierarchical cancelling method is applicable to both the normal and newly designed constellations. Since MED of MSB in the newly designed constellation is smaller than that in the normal constellation, the hierarchical cancelling method is beneficial in the newly designed constellation. A reason of this is that such the hierarchical cancelling method signifies that the MED of MSB in the newly designed constellation can be substantially increased approximately to at least that of the normal constellation. As compared with the normal constellation, the newly designed constellation is effective for fading channel even without the hierarchical cancelling method because MPD of the MSB is large although MED of the MSB is small.

Figure 10:
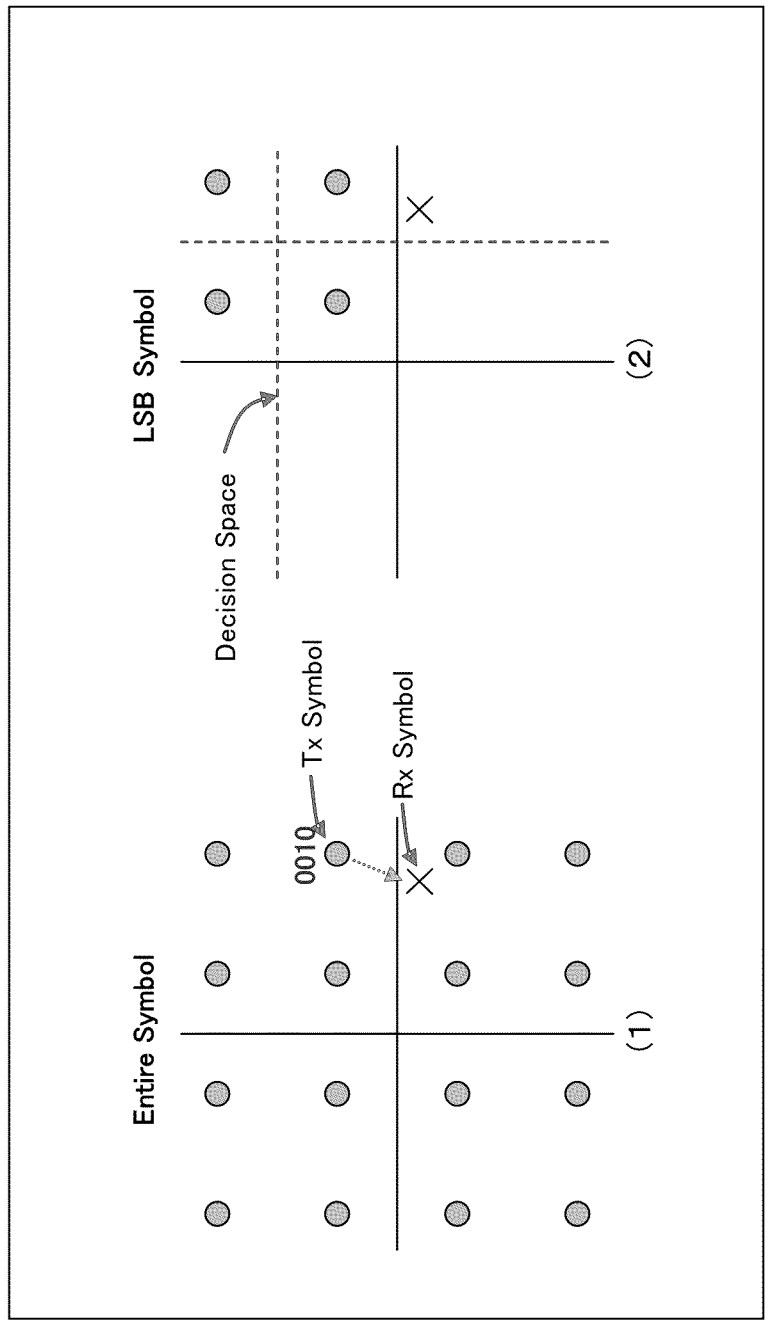
FIG. 10 is a schematic view illustrating a reception method using a hierarchical cancelling method in a newly designed 16QAM constellation.

FIG. 10 depicts how the hierarchical cancelling method functions, taking the normal constellation as an example. When the received symbol is 0010 as illustrated in (1) in FIG. 10, it is supposed that the received symbol is arranged in an LSB region differing from a region that the received symbol should be naturally positioned as a correct received symbol because of fading and Additive White Gaussian Noise (AWGN). It is further supposed that MSB (00) can be correctly received owing to the coding process with turbo code or the like.

In this case, the MSB is cancelled from the received signal with the use of the cancelling mechanism to erase choices that cannot occur, as depicted in (2) in FIG. 10, thereby narrowing down a decision space of LSB indicated by dotted line. Therefore, it is possible to increase the probability that the LSB symbol can be correctly detected.

Figure 14:
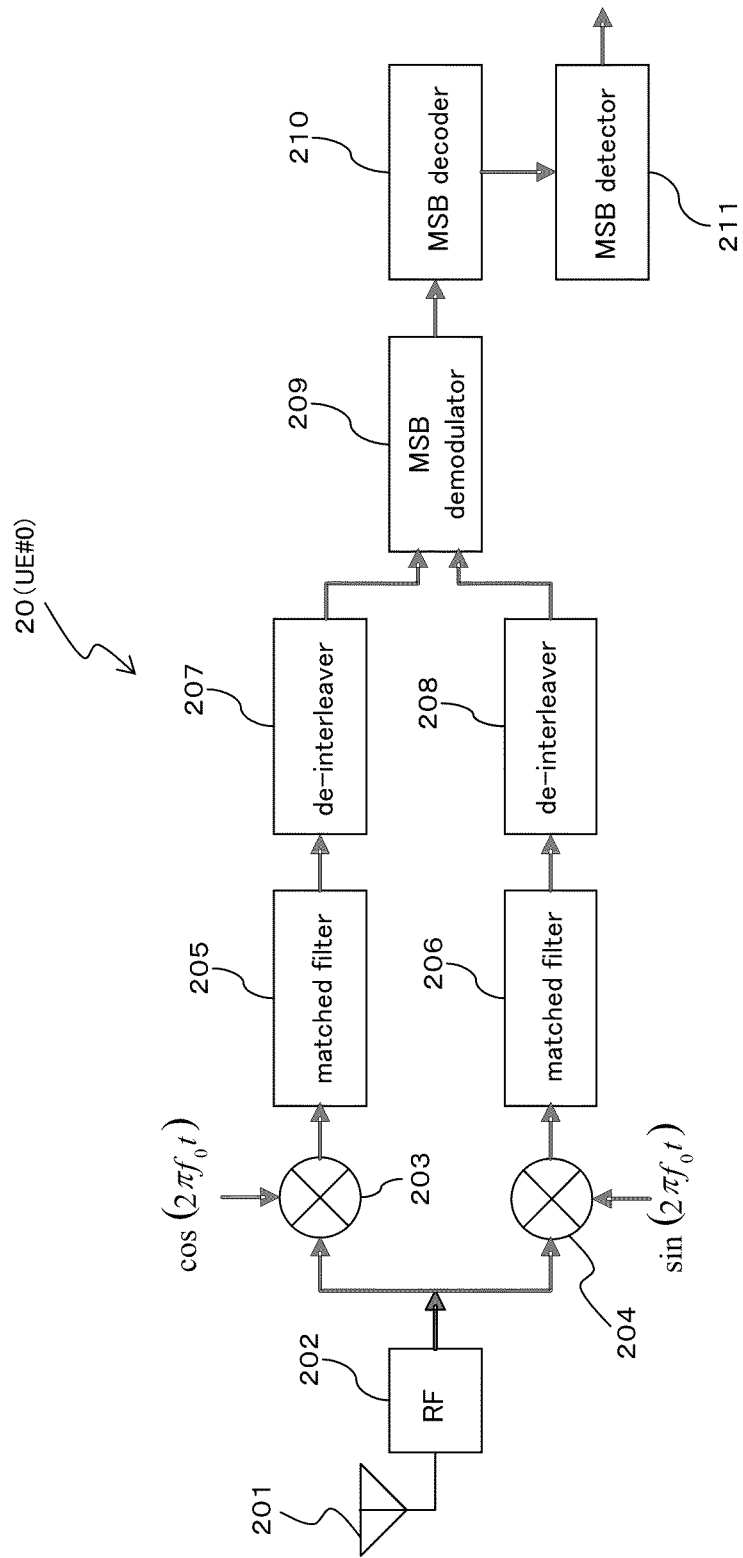
FIG. 14 is a block diagram illustrating an example of configuration of a receiver according to the embodiment.
Figure 15:
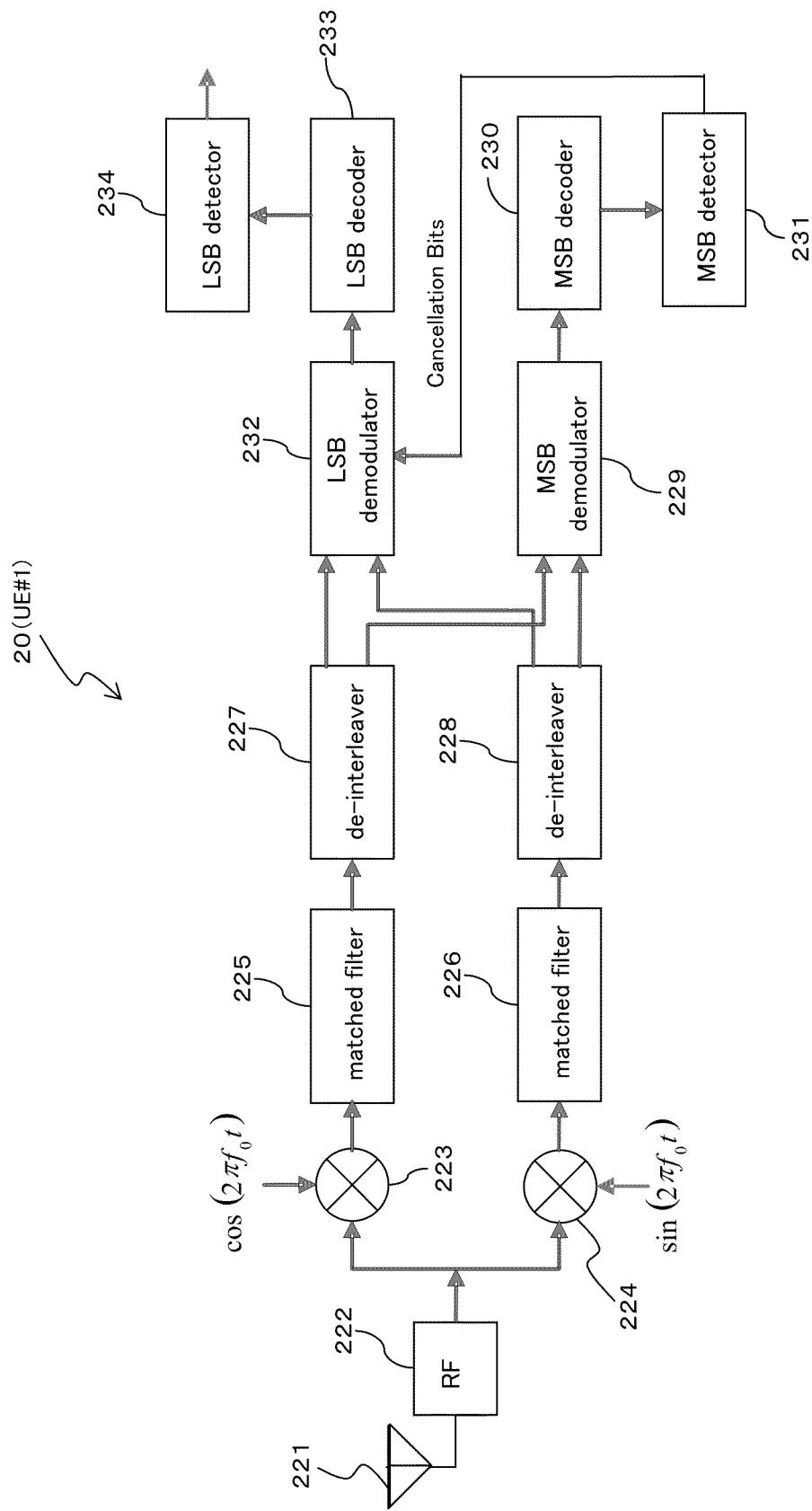
FIG. 15 is a block diagram illustrating an example of another configuration of the receiver according to the embodiment.

FIG. 14 depicts an example of configuration of a receiver for the UE #0, while FIG. 15 depicts an example of configuration of a receiver for the UE #1. The above-mentioned hierarchical cancelling method is applied to the receiving process in the UE #1 depicted in FIG. 15. Note that the UE #0 is in environments that the wireless link performance between the UE #0 and the base station 10 is worse than that between the UE #1 and the base station 10, as depicted in FIG. 1. It is further supposed that data destined for the UE #0 whose wireless link performance is worse is mapped to MSB, while data destined for the UE #1 whose wireless link performance is better is mapped to LSB by the hierarchical modulation.

The receiver (UE #0) depicted in FIG. 14 has a reception antenna 201, an RF unit 202, multipliers 203 204 configuring a quadrature detector, matched filters 205 and 206, de-interleavers 207 and 208, an MSB demodulator 209, an MSB decoder 210 and an MSB detector 211.

The reception antenna 201 receives a wireless signal from the base station 10. The received wireless signal is inputted to the RF unit 202.

The RF unit 202 performs a predetermined wireless receiving process on the wireless signal received by the reception antenna 201. The wireless receiving process includes processes such as low noise amplification, AD conversion, etc., for example. The received signal having undergone the wireless receiving process is inputted to the multipliers 203 and 204.

The multipliers 203 and 204 multiply the received signal having undergone the wireless receiving process by frequency signals whose phases differ by $\pi/2$ from one another, respectively. Quadrature detection is performed on the received signal. The detected signals (signal components whose phases differ by $\pi/2$ from one another) are inputted to the matched filters 207 and 208, respectively.

The matched filters 205 and 206 each performs correlation operation between the received signal having undergone the detection and a predetermined (known) signal (reference signal pattern) to detect a synchronization timing (for example, symbol synchronization) of the receiving process on the received signal.

The de-interleavers 207 and 208 perform de-interleaving process corresponding to the reverse process to the interleaving process by the interleavers 102 and 103 in the base station 10 (see FIG. 13) acting as the transmitter on outputted signals from the matched filters 205 and 206 according to the synchronization timings, respectively.

The MSB demodulator 209 selectively demodulates MSB in a bit string associated with a constellation point of the received signal from among the output signals of the de-interleavers 207 and 208. Namely, the MSB demodulator 209 demodulates $i_1^{(0)}, i_2^{(0)}, (q_0^{(0)}, q_1^{(0)})$ in the case of the example illustrated in FIG. 9.

The MSB decoder 210 decodes information (MSB) demodulated by the MSB demodulator 209 in a decoding scheme corresponding to a coding scheme in the base station 10.

Namely, the MSB demodulator 209 and the MSB decoder 210 is an example of demodulator-decoder which demodulates and decodes received data at a bit position unsusceptible to error among the bit positions which are relatively unsusceptible to error and susceptible to error in a bit string at a constellation point.

The MSB detector 211 detects a result of decoding by the MSB decoder 210 as received data destined for its own station 20 (UE #0), and outputs the data. The MSB detector 211 is an example of detector which detects received data obtained by the MSB decoder 210 which is an example of the demodulator-decoder as data destined for its own station 20 (UE #0).

The schemes of demodulation and decoding correspond to schemes of modulation and coding used in the base station 10 acting as a transmitter, which can be ones that are known between the base station 10 and the UE 20 or can be informed from the base station 10 to the UE 20 with the use of a signal or the like on the control channel.

On the other hand, the receiver (UE #1) depicted in FIG. 15 has a reception antenna 221, an RF unit 222, multipliers 223 and 224 which form a quadrature detector, matched filters 225 and 226, de-interleavers 227 and 228, an MSB demodulator 229, an MSB decoder 230, an MSB detector 231, for example. In addition, the UE #1 has an LSB demodulator 232, an LSB decoder 233 and an LSB detector 234.

The reception antenna 221 receives a wireless signal from the base station 10. The received wireless signal is inputted to the RF unit 222.

The RF unit 222 performs a predetermined wireless receiving process on the wireless signal received by the reception antenna 221. The wireless receiving process includes processes such as low noise amplification, AD conversion, etc., for example. The received signal having undergone the wireless receiving process is inputted to the multipliers 223 and 224.

The multipliers 223 and 224 multiply the received signal having undergone the wireless receiving process by frequency signals (carrier frequency $f_o$) whose phases differ by $\pi/2$ from one another). Whereby, quadrature detection is performed on the received signal. The detected signals (signal components whose phases differ by $\pi/2$ from one another) are inputted to the matched filters 225 and 226.

The matched filters 225 and 226 each performs correlation operation between the detected received signal and a predetermined (known) signal (reference signal pattern) to detect a synchronization timing (symbol synchronization) for the receiving process on the received signal.

The de-interleavers 227 and 228 perform de-interleaving process corresponding to a process reversal to the interleaving process by the interleavers 102 and 103 in the base station 10 (see FIG. 13) acting as a transmitter on output signals from the matched filters 225 and 226 according to the synchronization timings, respectively. Results of the de-interleaving process are given to the MSB demodulator 229 and the LSB demodulator 232.

The MSB demodulator 229 selectively demodulates MSB in a bit string associated with the aforementioned constellation point from among signals given from the de-interleavers 227 and 228. In the case of the example depicted in FIG. 9, the MSB demodulator 229 demodulates $i_1^{(0)}$, $i_2^{(0)}$, $(q_0^{(0)}, q_1^{(0)})$. Information destined for the UE #1 has not been mapped on the MSB (information destined for the UE #0 has been mapped), but the UE #1 demodulates the MSB.

The MSB decoder 230 decodes information (MSB) demodulated by the MSB demodulator 229 in a decoding scheme corresponding to a coding scheme in the base station 10.

The MSB detector 231 detects a result of decoding by the MSB decoder 230, and gives the result to the LSB demodulator 232.

Namely, the MSB demodulator 229, the MSB decoder 230 and the MSB detector 231 together form an example of first demodulation-decoder which demodulates and decodes first received data at a bit position unsusceptible to error in a bit string at a constellation point from the received signal.

The LSB demodulator 232 cancels a signal component of the MSB given from the MSB detector 231 in each signal given from the de-interleavers 227 and 228, and demodulates a remaining signal component (LSB), that is, information destined for its own station #1 mapped on the LSB.

The LSB decoder 233 decodes information (LSB) demodulated by the LSB demodulator 232.

Namely, the LSB demodulator 232 and the LSB decoder 233 together form an example of second demodulator-decoder which cancels the first received data obtained by the MSB detector 231 which is an example of the first demodulator-decoder from the received signal, demodulates and decodes the received signal, and obtains second received data at a bit position relatively susceptible to error in the bit string.

The LSB detector 234 detects a result of decoding by the LSB decoder 230 as received data destined for its own station 20 (UE #1), and outputs the data. The LSB detector 234 is an example of detector which detects the second received data obtained by the LSB decoder 233 which is an example of the second demodulator-decoder as data destined for its own station 20 (UE #1).

The schemes of the above-mentioned demodulation and decoding are correspond to modulation and coding used in the base station 10 acting as a transmitter, which can be ones that are known between the base station 10 and the UE 20 or can be informed from the base station 10 to the UE 20 with the use of a signal or the like on the control channel.

FIGS. 14 and 15 illustrate the UE #0 and UE #1 in a way that the UE #0 and the UE #1 having different wireless link performances have different configurations. However, such different configurations can be applied to a UE 20 free from fluctuations in the wireless link performance (including one that can ignore the fluctuations) such as a fixed terminal or the like.

When the UE 20 is a mobile station, the UE 20 can have the configuration depicted in FIG. 15 in common. In such case, the UE 20 adaptively chooses (switches) whether to output an output from the MSB detector 231 as received information without any change or to give the output from the MSB detector 231 to the LSB demodulator 232 as information to be used in the cancellation, according to whether information destined for its own station 20 has been mapped on the MSB or the LSB.

Whether the information destined for its own station 20 has been mapped on the MSB or the LSB can be notified from the base station 10 to the UE 20 with the use of a signal on the control channel, for example. When the UE 20 is a fixed terminal, the UE 20 can obey a rule decided beforehand between the base station 10 and the UE 20 (without the above-mentioned notification).

(1.9) Performance Evaluation

Illustrated below is an example of performance evaluation by simulation in link level of 16QAM and 64QAM on Rayleigh fading channel.

Table 3 below is an example of MPD on Rayleigh fading channel.

TABLE 3

| | MPD in normal and newly designed constellations (16QAM, 64QAM) | |
|---|---|---|
| Modulation | Normal Constellation | New Constellation |
| 16QAM | 0.16 | 0.447065 |
| 64QAM | 0.00907 | 0.056689 |

Figure 11:
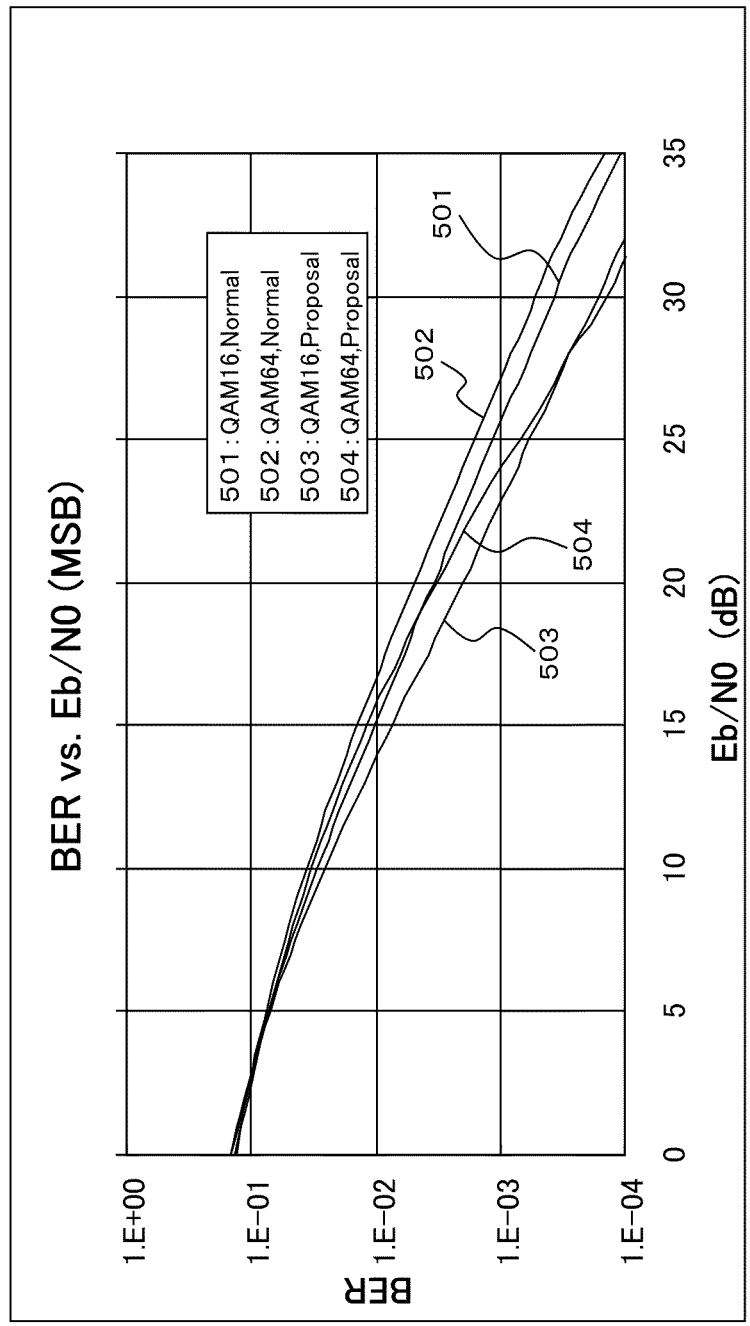
FIG. 11 is a diagram illustrating Bit Error Rate (BER) characteristics to energy per bit to noise power spectrum density ratio (Eb/NO) of MSB in newly designed QAM constellations in comparison with those in normal QAM constellations.
Figure 12:
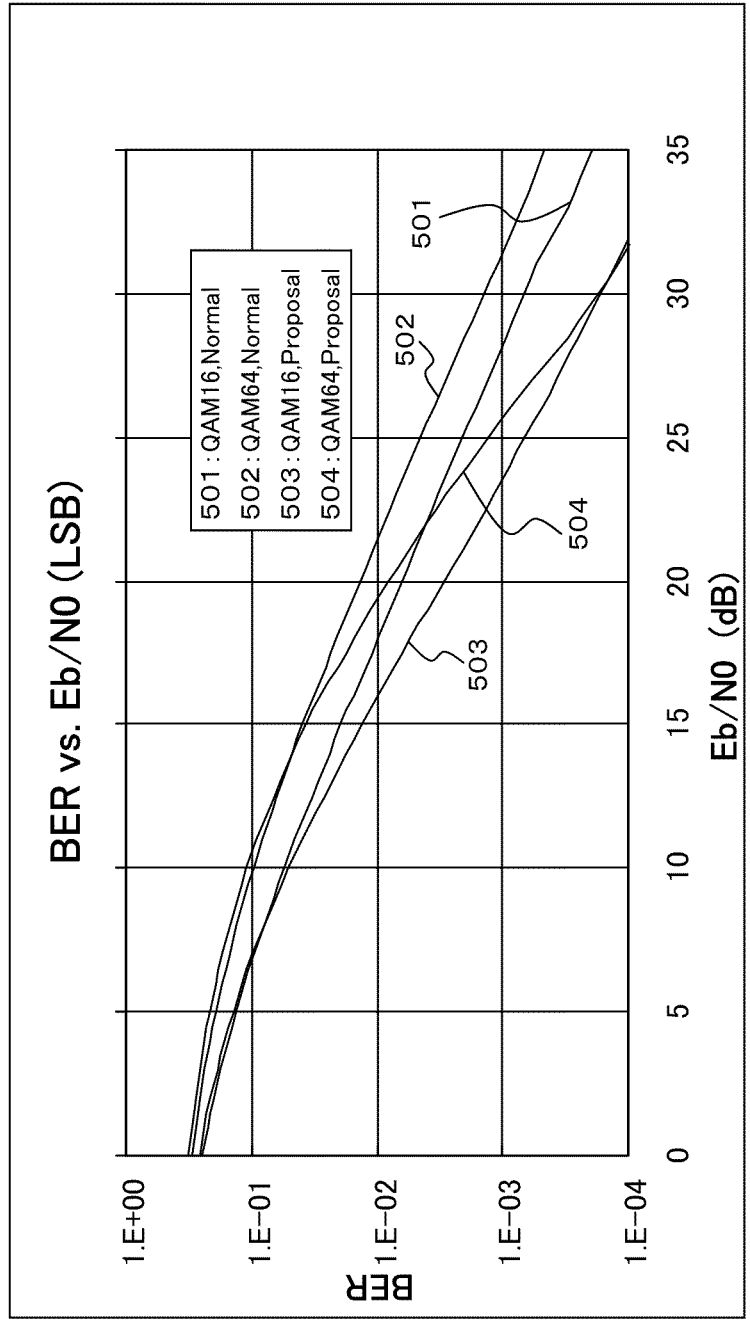
FIG. 12 is a diagram illustrating Bit Error Rate (BER) characteristics to energy per bit to noise power spectrum density ratio (Eb/NO) of LSB in newly designed QAM constellations in comparison with those in normal QAM constellations.

As illustrated in Table 3, MPD in the newly designed constellation is considerably larger than MPD in the normal constellation. Bit Error Rate (BER) to energy per bit to noise power spectrum density ratio Eb/NO of MSB are as depicted in FIG. 11, while the same of LSB are as depicted in FIG. 12. In FIGS. 11 and 12, characteristics 501 and 502 represent normal constellations of 16QAM and 64QAM, respectively, while characteristics 503 and 504 represent newly designed constellations of 16QAM and 64QAM proposed here, respectively.

Accordingly, it is found that the performance can be improved from the viewpoint of Bit Error Rate (BER). For example, in FIG. 11, when BER is $10^{-3}$, improvements of the performance of MSB in 16QAM and 64QAM from the viewpoint of Eb/NO are both about 2.5 [dB]. In FIG. 12, when BER is $10^{-3}$, improvements of the performance of LSB in 16QAM and 64QAM from the viewpoint of Eb/NO are 5 [dB] and 6 [dB], respectively.

The simulation in link level reveals that the newly design constellation can provide a gain of 2.5 [dB] for MSB and a gain of 5-6 [dB] for LSB, as compared with the normal constellation.

As stated above, the newly designed constellation according to this embodiment can keep MED of LSB and can increase MPD of MSB as compared with the normal constellation because arbitrary three adjacent constellation points on a phase plane form an equilateral triangle. Additionally, use of hierarchical cancel mechanism (method) can improve the LSB performance.

(1.10) Transmission Diversity Based on Hierarchical Modulation Scheme (Hierarchical Modulation with Transmit Diversity: HMTD)

The transmission diversity is an example of efficient effective solution to fading channel, which decreases the probability of deep down fading. Transmission bits in the hierarchical modulation scheme are distributively mapped on a plurality of independent fading channels, thus diversity gain can be expected.

When two UEs #0 and #1 transmit data over two independent channels, the diversity gain cannot be expected if the two UE #0 and UE #1 simply map the information bits on the respective channels #0 and #1, as described hereinbefore with reference to FIG. 2(A), for example.

Figure 2B:
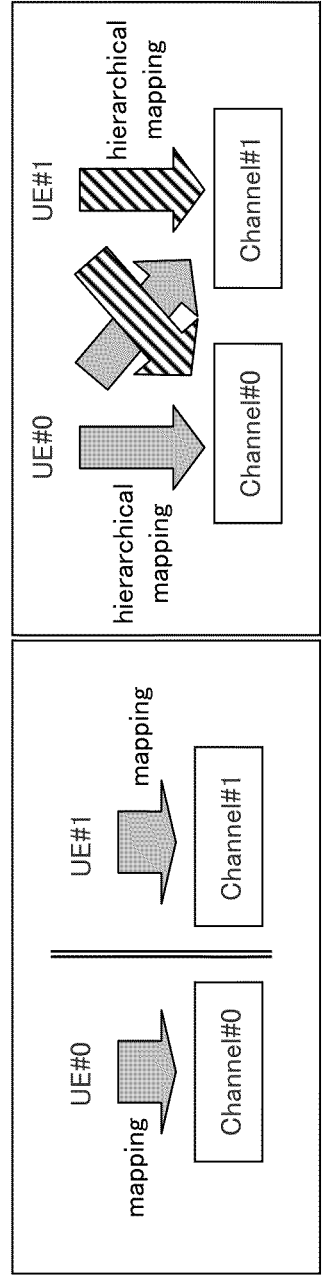
FIG. 2(B) is a diagram schematically illustrating an example of mapping process in hierarchical modulation.

To the contrary, when information bits destined for the UE #0 having poor channel quality are mapped to MSBs on the both channels #0 and #1 and information bits destined for the UE #1 having good channel quality are mapped to LSBs on the both channels #0 and #1, the diversity gain can be obtained, as described hereinbefore with reference to FIG. 2(B).

HMTD can be divided into two scenarios. One of the scenarios is the same data transmission, while the other is independent data transmission.

The former can expand the user coverage owing to an increase in gain due to energy synthesis of the same received symbols in the transmission diversity although the total throughput may be sacrificed more or less. The latter can improve the total throughput owing to the original hierarchical transmission diversity although the user coverage may be sacrificed more or less.

Now, usefulness of use of HMTD against fading channel will be explained.

According to the hierarchical modulation scheme, data (information bits) is cross-mapped on a plurality of channels and transmitted, whereby probability of down fading can be decreased. Use of a Maximum Likelihood Detector (MLD) can improve the system performance without channel coding.

Generally, the order of modulation and coding used in MBMS systems is low. For example, modulation scheme is QPSK, and the coding rate is ⅓. Therefore, when MBMS data is transmitted at MSB on the hierarchical modulation scheme channel, information destined for another user (UE), that is, information destined for a unicast user, for example, can be mapped to a randomized constellation point corresponding to a channel relating to LSB, which can realize natural diversity.

The lower the coding rate, that is, the larger the number of bits to be redundantly transmitted, the higher the diversity gain can be. When QPSK is compared with 16QAM, the former has a constant transmission power, while the latter has two transmission power levels of 0.1 and 0.9. Namely, the transmission bit can acquire a high transmission power at a rate of 50%, and the performance is improved as compared with a case of a lower coding rate. The same is true for 64QAM or QAM of lager bits.

If more transmission power is assigned to an MBMS user and less transmission power is assigned to a unicast user, it becomes possible to improve the robustness to MBMS. This is one of the priority controls.

When the constellation design is non-uniform QAM constellation aforementioned, further transmission diversity can be expected.

(1.11) Bit Mapping Based on Hierarchical Modulation Scheme

Data symbol bits are classified into MSB, SB and LSB, which are mapped to a constellation point on a phase plane when multi-level QAM modulation is used.

The base station assigns a lower MCS to a UE #0 having poor wireless link performance when giving more time slots to the UE #0 with the use of an existing transmission method to assure the system performance, thereby balancing the total throughput among the UEs.

Instead, in HMTD, a channel having good performance is used for data transmission to a UE #0 having poor wireless link performance, while a channel having poor performance is used for data transmission to a UE #1 having good receive performance. Here, a channel having good performance signifies a channel relating to MSB or a transmission diversity channel using plural channel resources.

To sensuously understand how HMTD functions well in a dynamic performance network, cross mapping between UEs #0 and #1, and channels #0 and #1 is taken as an example.

In this example, it is supposed that data symbols destined for both the UE #0 and #1 are transmitted over two channels #0 and #1 which are statistically independent from one another with the use of 16QAM modulation scheme. To a 16QAM constellation having $i_0$ and $q_0$ of MSB and $i_1$ and $q_1$ of LSB, applicable is either the normal constellation or the non-uniform QAM constellation aforementioned.

It is illustrated by an example assuming that four bits are sent to the UE #1 over the both channels #0 and #1, while two bit which is the same information is sent to the UE #0 in the transmission diversity scheme. To sensuously explain the mapping scheme in this case, an example of numerical values is indicated below.

For the UE #1, four bits are divided into two bits and two bits, and one (for example, 01) of the two sets of two bits is mapped to the channel #0 which is an example of first channel, and the other set (for example, 10) is mapped to the channel #1 which is an example of second channel, and transmitted.

For the UE #0, the same two bits (for example, 11) are mapped to both the channels #0 and #1, and transmitted.

The bits destined for the UE #0 are mapped to MSB, while the bits destined for the UE #1 are mapped to LSB.

Figure 16:
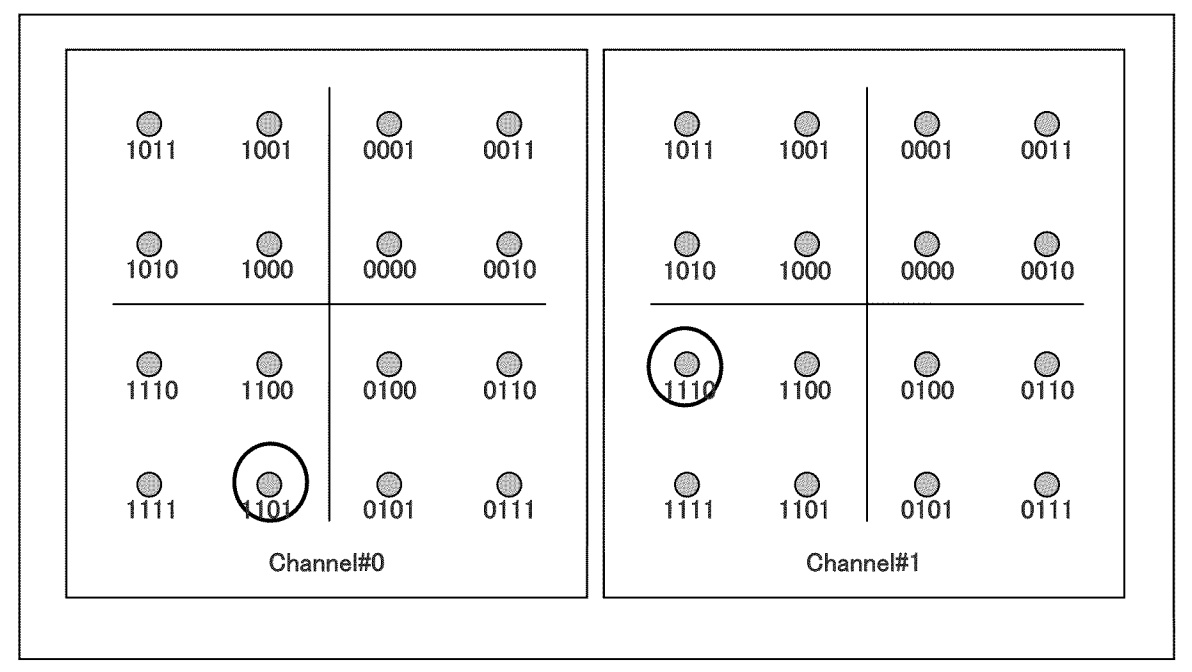

In this case, the first transmission symbol transmitted on the channel #0 is "1101", while the second transmission symbol transmitted on the channel #1 is "1110", as depicted in FIG. 16, for example. Incidentally, FIG. 16 depicts normal QAM constellations, but the same is true for non-uniform QAM constellations aforementioned.

Data destined for the UE #1 having good link performance is distributively mapped to bit positions unsusceptible to error of a first constellation point on a phase plane corresponding to the first channel belonging to a link between the base station 10 and the UE #1 and bit positions unsusceptible to error of a second constellation point on a phase plane corresponding to the second channel belonging to the link. The same data destined for the UE #0 having poor link performance is mapped to bit positions susceptible to error of the first and second constellation points. Whereby, the same data is transmitted to the UE #0 through different channels, so that the UE #0 can obtain transmission diversity gain.

The UE #1 extracts LSB bits from received signals on the both channels #0 and #1, and decodes four bits destined for its own station (UE) #1. On the other hand, the UE #0 synthesizes received symbols on the both channels #0 and #1 on the basis of Maximum Ratio Combine (MRC), for example, and decodes the MSB bits as if the MSB bits are a QPSK symbol. The receive SNR of the UE #0 can be improved as a result of the synthesizing. The capacity gain of the fading channel can be improved.

(1.12) Formulization of HMTD

HMTD for channel based on any modulation scheme is generalized. A constellation point $C_{k,n,l}$ can be given by an expression in vector form with the in-phase component bit being $i_{k,n,l,m}$ and the quadrature component bit being $q_{k,n,l,m}$, as follows.

$$C_{k,n,l} = \left( \underbrace{i_{k,n,l,0} \; q_{k,n,l,0}}_{MSB} \; i_{k,n,l,1} \; q_{k,n,l,1} \; \cdots \; \underbrace{i_{k,n,l,M_k-1} \; q_{k,n,l,M_k-1}}_{LSB} \right) \quad (4)$$

In Expression (4), $i_{k,n,l,m}$ and a $q_{k,n,l,m}$ represent an in-phase component bit and a quadrature component bit of the m-th bit of the n-th symbol on the first channel of the k-th UE. $M_k$ represents the maximum bit number of both the in-phase component and the quadrature component in a signal constellation according to the modulation order of the k-th UE. For example, $M_k$=1, 2 and 3 correspond to QPSK, 16QAM and 64QAM, respectively.

When information bit is not transmitted, an equation $i_{k,n,l,m}$=$q_{k,n,l,m}$=0 is satisfied. When mapping is not overlapped between UEs on plural channels, a signal $S_{n,l}$ in the hierarchical modulation to be mapped on a constellation can be given by the following expression (5).

$$S_{n,l} = \sum_{k=0}^{K-1} C_{k,n,l} \quad (5)$$

In Expression (5), K represents the number of UEs whose data signals are simultaneously mapped on a constellation on each channel. For example, when K=2 and two UEs 20 are expressed as $k_0$ and $k_1$, data destined for the two UEs is mapped on a 16QAM constellation in the hierarchical modulation scheme, and transmitted over a pair of the $l_0$-th channel and the $l_1$-th channel.

In such case, $C_{k,n,l}$ can be alternatively expressed as follows:

$C_{k_0,n_0,l_0} = (i_{k_0,n_0,l_0,0} \; q_{k_0,n_0,l_0,0} \; 0 \; 0)$ $C_{k_0,n_1,l_1} = (i_{k_0,n_1,l_1,0} \; q_{k_0,n_1,l_1,0} \; 0 \; 0)$ $C_{k_1,n_0,l_0} = (0 \; 0 \; i_{k_1,n_0,l_0,1} \; q_{k_1,n_0,l_0,1})$ $C_{k_1,n_1,l_1} = (0 \; 0 \; i_{k_1,n_1,l_1,1} \; q_{k_1,n_1,l_1,1})$ [Expression 11]

Accordingly, a decoded transmission signal on the $I_0$-th channel can be given by the following expression (6):

[Expression 12]

$$S_{n_0,l_0} = (i_{k_0,n_0,l_0,0} \; q_{k_0,n_0,l_0,0} \; i_{k_1,n_0,l_0,1} \; q_{k_1,n_0,l_0,1}) \quad (6)$$

A decoded transmission signal on the $I_1$-th channel can be given by the following expression (7):

[Expression 13]

$$S_{n_1,l_1} = (i_{k_0,n_1,l_1,0} \; q_{k_0,n_1,l_1,0} \; i_{k_1,n_1,l_1,1} \; q_{k_1,n_1,l_1,1}) \quad (7)$$

[2] Others

In the foregoing embodiment, non-uniform constellation is applied to communications in DL by giving attention to communications in DL, but can be applied to communications in UL. For example, the configuration of the transmitter (multi-level modulator) depicted in FIG. 13 is applicable as an example of transmission system of UE 20. The configurations of the receivers depicted in FIGS. 14 and 15 are applicable as examples of receiving system of the base station 10.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments have been described in detail, it should be understood that the various changes, substitutions, and alterations could be made hereto without departing from the spirit and scope of the invention.

What is claimed is:

1. A transmitter for transmitting signals obtained by associating a plurality of bit strings with a plurality of signal points represented on a phase plane, respectively, and performing multi-level modulation according to each of the signal points, the transmitter comprising:

a multi-level modulator that performs the multi-level modulation with a signal point constellation in which each signal point on the phase plane constitutes a vertex of at least one equilateral triangle with sides of predetermined length and, a distance between a signal point closest to origin on the phase plane and the origin is longer than a reference distance and transmission mean power of all the constellation points is equal to or less than a reference transmission mean power, the reference distance and the reference transmission mean power being values corresponding to the distance and the transmission mean power, respectively, in the case that signal points are arranged in a grid pattern with a spacing of the same length as sides of the equilateral triangle.

2. The transmitter according to claim 1, wherein the multi-level modulator maps data destined for receivers having different wireless link performances between the receivers and the transmitter to bit positions having different degrees of susceptibility to error generating due to the association in the bit string associated with any one of the signal points.

3. The transmitter according to claim 2, wherein data destined for a receiver among the receivers, the receiver having good wireless link performance, is mapped to a bit position relatively susceptible to error in the bit string; and data destined for the receiver having poor wireless link performance is mapped to a bit position relatively unsusceptible to error in the bit string.

4. A receiver for receiving the signals from the transmitter according to claim 3 over the wireless link having poor performance, the receiver comprising:
 a demodulator-decoder that demodulates and decodes received data at the bit position relatively unsusceptible to error in the bit string; and
 a detector that detects the received data obtained by the demodulator-decoder as data destined for its own receiver.

5. A receiver for receiving the signals over the wireless link having good performance from the transmitter according to claim 3, the receiver comprising:
 a first demodulator-decoder that demodulates and decodes first received data at the bit position relatively unsusceptible to error in the bit string from a received signal;
 a second demodulator-decoder that cancels the first received data obtained by the first demodulator-decoder from the received signal, demodulates and decodes the received signal, and obtains second received data at the bit position relatively susceptible to error in the bit string; and
 a detector that detects the second received data obtained by the second demodulator-decoder as data destined for its own receiver.

6. The transmitter according to claim 2, wherein data destined for a receiver among the receivers, the receiver having good wireless link performance, is distributively mapped to the bit position unsusceptible to error of a first signal point on a phase plane corresponding to a first channel belonging to the wireless link and the bit position unsusceptible to error of a second signal point on a phase plane corresponding to a second channel belonging to the wireless link; and
 the same data destined for the receiver having poor wireless link performance is mapped to the bit positions susceptible to error at the first and second signal points.

7. A transmission method of transmitting signals obtained by associating a plurality of bit strings with a plurality of signal points represented on a phase plane, respectively, and performing multi-level modulation according to each of the signal points, the transmission method comprising:
 performing the multi-level modulation with a signal point constellation in which each signal point on the phase plane constitutes a vertex of at least one equilateral triangle with sides of predetermined length and, a distance between a signal point closest to origin on the phase plane and the origin is longer than a reference distance and transmission mean power of all the constellation points is equal to or less than a reference transmission mean power, the reference distance and the reference transmission mean power being values corresponding to the distance and the transmission mean power, respectively, in the case that signal points are arranged in a grid pattern with a spacing of the same length as sides of the equilateral triangle.

8. The transmission method according to claim 7, wherein, in the multi-level modulation, data destined for receivers having different wireless link performances between receivers and a transmitter are mapped to bit positions having different degrees of susceptibility to error generating due to the association in the bit string associated with any one of the signal points.

9. The transmission method according to claim 8, wherein data destined for a receiver having good wireless link performance to a bit position relatively susceptible to error in the bit string; and
 data destined for a receiver having poor wireless link performance is mapped to a bit position relatively unsusceptible to error in the bit string.

10. A reception method of receiving the signals transmitted in the transmission method according to claim 9 over the wireless link having poor performance, the reception method comprising:
 demodulating and decoding received data at the bit position relatively unsusceptible to error in the bit string; and
 detecting received data obtained through the demodulation and decoding as data destined for its own.

11. A reception method of receiving the signals transmitted in the transmission method according to claim 9 over the wireless link having good performance, the reception method comprising:
 demodulating and decoding first received data at the bit position relatively unsusceptible to error in the bit string from a received signal;
 cancelling the first received data obtained through the demodulation and decoding from the received signal;
 demodulating and decoding the received signal having undergone the cancelling to obtain second received data at the bit position relatively susceptible to error in the bit string; and
 detecting the obtained second received data as data destined for its own.

12. The transmission method according to claim 8, wherein data destined for a receiver having good wireless link performance is distributively mapped to the bit position unsusceptible to error of a first signal point on a phase plane corresponding to a first channel belonging to the wireless link and the bit position unsusceptible to error of a second signal point on a phase plane corresponding to a second channel belonging to the wireless link; and
 the same data destined for a receiver having poor wireless link performance is mapped to the bit positions susceptible to error of the first and second signal points.

* * * * *